(12) United States Patent  (10) Patent No.: US 8,935,603 B2
Kief et al.  (45) Date of Patent: Jan. 13, 2015

(54) SYSTEM AND METHOD FOR PRESENTATION CREATION

(75) Inventors: Christopher Kief, New York, NY (US); David Lee, New York, NY (US)

(73) Assignee: Pilot.Is LLC, New York, NY (US)

( * ) Notice: Subject to any disclaimer, the term of this patent is extended or adjusted under 35 U.S.C. 154(b) by 0 days.

(21) Appl. No.: 13/224,315

(22) Filed: Sep. 1, 2011

(65) Prior Publication Data

US 2012/0198325 A1  Aug. 2, 2012

Related U.S. Application Data

(60) Provisional application No. 61/379,037, filed on Sep. 1, 2010, provisional application No. 61/379,236, filed on Sep. 1, 2010.

(51) Int. Cl.
*G06F 3/00* (2006.01)
*G06F 17/22* (2006.01)

(52) U.S. Cl.
CPC .................................. *G06F 17/2241* (2013.01)
USPC .......................................................... 715/234

(58) Field of Classification Search
CPC ......................... G06F 17/30056; G06F 3/0484
USPC .................. 715/234, 243, 254, 255, 730, 732
See application file for complete search history.

(56) References Cited

U.S. PATENT DOCUMENTS

| | | | |
|---|---|---|---|
| 7,743,331 B1* | 6/2010 | Fleischer et al. | 715/731 |
| 8,504,348 B2* | 8/2013 | Error | 703/22 |
| 2006/0129933 A1 | 6/2006 | Land et al. | |
| 2007/0074268 A1* | 3/2007 | Pepper et al. | 725/136 |
| 2007/0204211 A1 | 8/2007 | Paxson | |
| 2007/0260695 A1 | 11/2007 | Fenton | |
| 2008/0085096 A1* | 4/2008 | Marshall | 386/52 |
| 2010/0082576 A1* | 4/2010 | Walker et al. | 707/706 |
| 2010/0122171 A1* | 5/2010 | Bauchot et al. | 715/732 |

OTHER PUBLICATIONS

Johnson, Steve, "Microsoft(r) PowerPoint(r) 2010 On Demand," Jul. 19, 2010, Que, pp. 332-333.*
"Microsoft Office 2010 Release Date," Dec. 1, 2009, <http://blog.techhit.com/55485-microsoft-office-2010-release-date>.*
"Microsoft(r) Office," 2010, screenshots created Feb. 3, 2014, pp. 1-4.*
PCT International Search Report from PCT/US11/50274 mailed on Jan. 17, 2012.

* cited by examiner

*Primary Examiner* — Kyle Stork
(74) *Attorney, Agent, or Firm* — Kenyon & Kenyon LLP

(57) ABSTRACT

A system and method are provided for a network-based content management system (CMS) for providing a creative storytelling platform. Such platform may provide for information to be shared via a slide(s). For example, such slide(s) can be an image, text, text with an image, text with a background image, an RSS feed, a feed from a blog, a feed from a Twitter stream, a Vimeo video, etc. The slides can be grouped together and nested below or above one or more slides. The slide can be associated in a hierarchy which extends horizontally and vertically. Embodiments of the present invention provide for the hierarchical set of slides to be navigated by a user via a keyboard, touchscreen, or other communication means. The views of the slides can be changed, e.g., from filmstrip to grid view to single slide full screen views. One or more slides and/or sets of slides can be password protected.

21 Claims, 38 Drawing Sheets

Fig. 8

| | | | | | New Slide |
|---|---|---|---|---|---|
| LIGHTBOX ADMIN(logout) | Lightbox | Account | Password | Display Options | Manage Filters Lightbox Manager |

Filter Categories

| Clients | Media | Date | Location | + Add a New Category |
|---|---|---|---|---|
| Aaaaa | Fffffff | 2010 | New York | |
| Bbbbbb | Gggggg | 2011 | Los Angeles | |
| CCCCC | Eeeeee | 2012 | France | |
| Dddddd | Hhhhhh | 2013 | Brazil | |
| Eeeeee | Iiiiiiiii | 2014 | New Guinea | |

Uncategorized Tags

Submit

| | Lightbox Manager | |
|---|---|---|
| LIGHTBOX ADMIN(logout) | Lightbox  Account  Password  Display Options  Manage Filters  Lightbox Manager | New Slide |

Lightbox Contents

| Lightbox Name |
|---|
| Slide Name |
| Slide Name |
| Lightbox Name |
| Lightbox Name |
| Slide Name |
| Slide Name |
| Slide Name |
| Slide Name |
| Slide Name |
| Slide Name |
| Slide Name |

Fig. 13

SYSTEM AND METHOD FOR PRESENTATION CREATION

CROSS-REFERENCE TO RELATED APPLICATIONS

This application claims priority to U.S. Provisional Patent Application No. 61/379,236, filed Sep. 1, 2010, entitled "System and Method for Creative Storytelling Presentation" and U.S. Provisional Patent Application No. 61/379,037, filed Sep. 1, 2010, entitled "System and Method for Presentation Creation," each of which is herein incorporated by reference in its entirety.

COPYRIGHT AND LEGAL NOTICES

A portion of the disclosure of this patent document may contain material which is subject to copyright and/or trademark protection. The copyright and trademark owner to specific portions has no objection to the facsimile reproduction by anyone of the patent document or the patent disclosure, as it appears in the U.S. Patent and Trademark Office patent files and/or records, but otherwise reserves all copyrights and trademark rights whatsoever.

BACKGROUND OF THE INVENTION

Storytelling, as an art, has evolved over centuries from being verbally communicated to electronically communicated. Likewise, within the field of electronic communications, methods and systems for storytelling have progressed.

However, even with such progress, there still exists a need for a platform via which storytelling with tangents and side thoughts can be communicated in an efficient and elegant manner. Further, there exists a need for a platform via which a user or storyteller can check and search on specific topics or subjects within the story and/or tangential story.

SUMMARY OF THE INVENTION

Embodiments of the present invention enhance the overall efficiency and functionality of a user's experience with communicating information and/or receiving information. Such information, for example, is communicated as a story. Embodiments of the present invention provide a network-based content management system (CMS) and method for providing a creative storytelling platform. Embodiments of the present invention provide at least one of a linear and a nonlinear platform via which information and/or at least one story is communicated. Embodiments of the present invention provide such a platform which can be executed or run via a processor, either on the processor or remotely.

Embodiments of the present invention provide for information to be shared via a slide(s). For example, such slide(s) can be an image, text, text with an image, text with a background image, an RSS feed, a feed from a blog, a feed from a Twitter stream, a Vimeo video, etc. Embodiments of the present invention provide for the slides to be grouped together and nested below or above the others slides. Embodiments of the present invention provide for the slides to be associated in a hierarchy which extends horizontally and vertically. Embodiments of the present invention provide for the hierarchical set of slides to be navigated by a user via a keyboard, touchscreen, or other communication means. Embodiments of the present invention provide views to be changed, e.g., from filmstrip to grid view to single slide full screen views.

Embodiments of the present invention provide for one or more slides or sets of slides to be password protected.

Embodiments of the present invention provide a presentation slide platform which provides for a nonlinear story to be communicated. Embodiments of the present invention provide a presentation slide platform for communicating at least one nonlinear story and at least one linear story within the same file(s). Embodiments of the present invention provide for a linear set of slides, and for a subset of slides linked or associated with one or more slides of the linear set of slides—thus, providing a nonlinear set of slides.

Embodiments of the present invention provide a presentation slide platform providing for the communication of a nonlinear story in which a user can select or indicate a tag or other identifier so that all presentation slides in the linear and/or nonlinear stor(ies) associated with that tag or other identifier are assimilated. For example, such assimilation is presented to a user as a batch of slides or the like, each of which are associated with that tag or other identifier. For example, a user can return to the full story from the, e.g., filtered slides batch at anytime by clicking a return button provided or a breadcrumb provided or other mechanism.

Embodiments of the present invention provide for a software platform through which a user can display content or review content in a slideshow style presentation. Embodiments of the present invention provide for a software platform to run via a website. Embodiments of the present invention provide for a software platform to run on a website, the website being run on multiple mobile devices. For example, the website and thus the software platform embodiments of the present invention are run using HTML5 allowing for cross-platform performance. Embodiments of the present invention are device-neutral, e.g., they can be used across a variety of different operating systems and devices.

Embodiments of the present invention provide for a web-based, network-created content management system running on a website, providing a creative storytelling platform. Embodiments of the present invention provide for a robust, multimedia platform for such creative storytelling and/or information sharing. Embodiments of the present invention provide for an electronic portfolio of an entity's work, e.g., art, writings, video, etc. Embodiments of the present invention provide for a digital brochure which can provide for story-telling, tangential story-telling, and efficient groupings and assimilations of desired portions of the brochure.

Embodiments of the present invention can be executed on any device. For example, an embodiment of the present invention can be prepared on a desktop computer and later viewed via a laptop computer, a tablet, an iPad, an iPhone, a mobile device, a handheld mobile device, a mobile telephone, a smartphone, a netbook, a web browser device and other devices or access means. Embodiments of the present invention provide for form factors which allow for conformance of the presentation to whatever device is viewing the presentation. Embodiments of the present invention include cross-platform compatibility, providing immediate conformance of a presentation or story for optimal viewing.

Embodiments of the present invention provide a platform allowing for linking, associating, and/or embedding one or more social platforms. Embodiments of the present invention provide a nonlinear presentation slide platform which allow for embedding of videos from a different platform, e.g., YouTube, Vimeo, storage medium, cloud. Embodiments of the present invention provide a nonlinear presentation slide platform which allow for dynamic and/or static linking, associating, and/or embedding material or feeds from a storage medium or social platform. Such material and feeds can include photos, RSS feed(s), feeds from Tweets, photos and/or videos from Flickr, material from online or harddrive accounts or other electronic storage locations, videos, links from blog(s), and other embedable/linkable/associatable files.

Embodiments of the present invention can be hosted on a remote server or device, a cloud, or a personal server or device. Embodiments of the present invention can be downloaded onto a personal device, e.g., a laptop computer or storage medium.

BRIEF DESCRIPTION OF THE DRAWINGS

FIG. 8 shows an example embodiment of the present invention.

FIG. 9 shows an example embodiment of the present invention.

FIG. 10 shows an example embodiment of the present invention.

FIG. 13 shows an example embodiment of the present invention.

DETAILED DESCRIPTION

The following description provides specific details for a thorough understanding of, and enabling description for, various embodiments of the technology. One skilled in the art will understand that the technology may be practiced without many of these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

Figure 1:
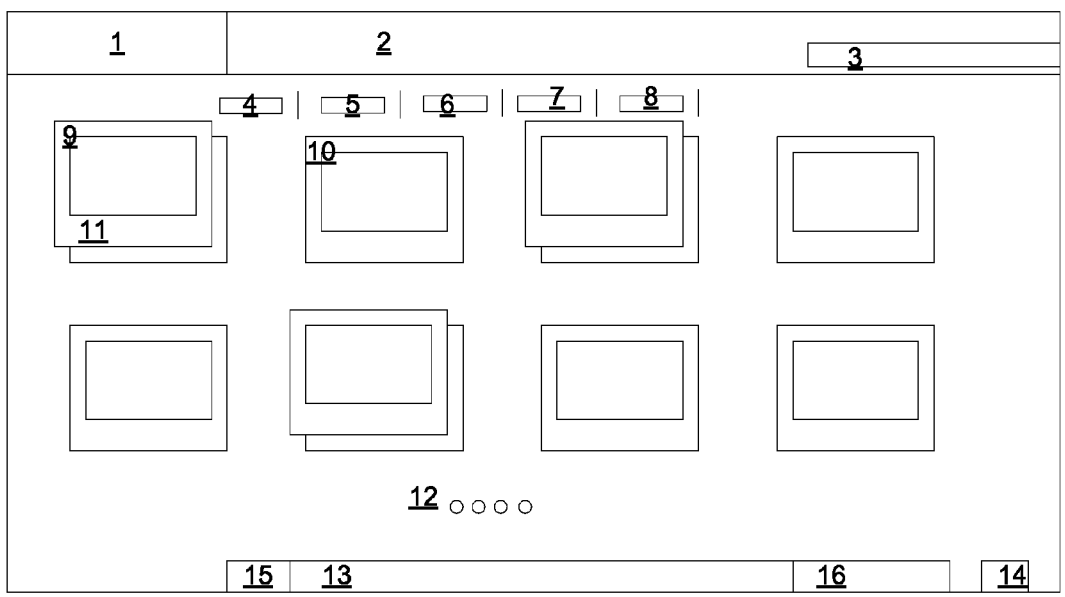
FIG. 1 shows an example grid view of an embodiment of the present invention.

FIG. 1 shows a grid view of an embodiment of the present invention. In FIG. 1, the logo 1 of a user or entity can be displayed. In an example, the logo 1 for the site is defined by the content editor on the Administration Panel, Display Options page. A click on the logo 1 can be made to be non-functional or can be made to reload the home page of the site as defined by, for example, the content editor on the Administration Panel, Display Options page. In FIG. 1, the title bar 2 displays the current title/position within the site. In grid view (as shown), the title bar displays the current "lightbox" name. For example, as shown here, the root/master lightbox title is not displayed. However, in slide view, the title bar may display the title of the current slide/lightbox.

For user initiated searches or filters, for example, the title bar 2 can be used to display the search string or filter term. For example, if the title bar length cannot accommodate the nested lightbox names, the lightbox titles "backflow" to hide higher level lightboxes (e.g. " . . . Lightbox 3\ Lightbox 4\Lightbox 5"). The search box 3 allows for a text entry field. The search box 3 can accept all ascii characters. If one clicks on the magnifying glass icon or press the return key, the entered text is submitted to the search engine. The search engine can be a search engine available for use in any given systems today. The slide view 4 provides for a reloading of the page in Slide View, beginning with the first slide/lightbox of the current page. If the active view is already in slide view, the on click is non-functional. The grid view 5 provides for a reloading of the page in Grid View. If the active view is already grid view, then the on click is non-functional. The grid view 5 displays slides/lightboxes in a grid determined by the user's monitor resolution. Content in grid view may be displayed in 4:3 aspect ratio, regardless of original content dimensions. Full side 6 provides for an on click which reloads the page in Full Size View. If the current view is grid view, full size view will begin with the slide in the upper, left hand corner. If the current view is grid view, full size view will begin with the currently viewed slide. If the active view is already full size, then the on click is non-functional.

Background toggle 7 provides for an on click which loads the alternate color palette as defined by, e.g., the content editor on the Administration Panel, Display Options page. If the alternate color palette is currently displayed, on click loads the default color palette. Share 8 provides for an on click which opens the sharing options lightbox panel.

Lightboxes 9 are ordered collections of individual slides. The slide appearing first in the user-defined slide order becomes the representative slide in grid and thumbnail views. Lightboxes are visually differentiated from slides by the appearance of a staggered stacking of slides connoting multiple content elements. The on click of a lightbox in grid view displays the lightbox in a selected state. The on double click of a lightbox in grid view opens the selected lightbox in grid view. The content in grid view is displayed in 4:3 aspect ratio, regardless of original content dimensions. Slide 10 provides representations of individual content elements. The on click of a slide in grid view displays the slide in a selected state. The on double click of a slide in grid view opens the selected slide in slide view. For example, the content in grid view is displayed in 4:3 aspect ratio, regardless of original content dimensions.

Slide/lightbox title 11 provides for the titles for lightboxes or slides which are defined by the user at time of content creation. Slide titles may contain any alphanumeric characters (A-Z, 0-9) as well as HTML supported special ASCII characters. The character limit can be made. Pagination 12 provides for a visual representation of the both the total number of pages in the current lightbox and current page. In an embodiment, pagination allows for a maximum of 10 pages, for a limit of 80 slides/child lightboxes within each parent lightbox. The on click of a dot advances the view to the corresponding page without requiring a page refresh. Pages are also navigable by using the left and right arrow keys, which advance the page in the corresponding direction. If only one page exists within the currently selected lightbox, these page indicators are not displayed. Footer 13 of the page contains filters defined by, e.g., the content editor on the Administration Panel, Manage Filters page. The on click of a filter reloads page showing all content within the site corresponding to the selected filter in grid view. If no filters have been added, this copy and all links are not displayed. The footer also displays non-functional 'Powered by LIGHTBOX' copy, copyright, and privacy policy link here in this example. The on click of the privacy policy link is provided to open the privacy policy in a lightbox overlay.

Social media links 14 provide for the display of social media links is determined by, e.g., the content editor on the Administration Panel, Display Options page. Social media links can be limited to, e.g., Twitter and Facebook, or allow other social media site links. The on click of the social media links opens the corresponding link in a new window. The Footer Lightbox/CMS logo 15, 16 may be used to indicate that an unpaid user accounts needs to be satisfied before a user can create their own lightbox. The on click of the logo or the CTA opens the Lightbox CMS site in a new window. Paid accounts may disable the display of these elements.

Figure 2:
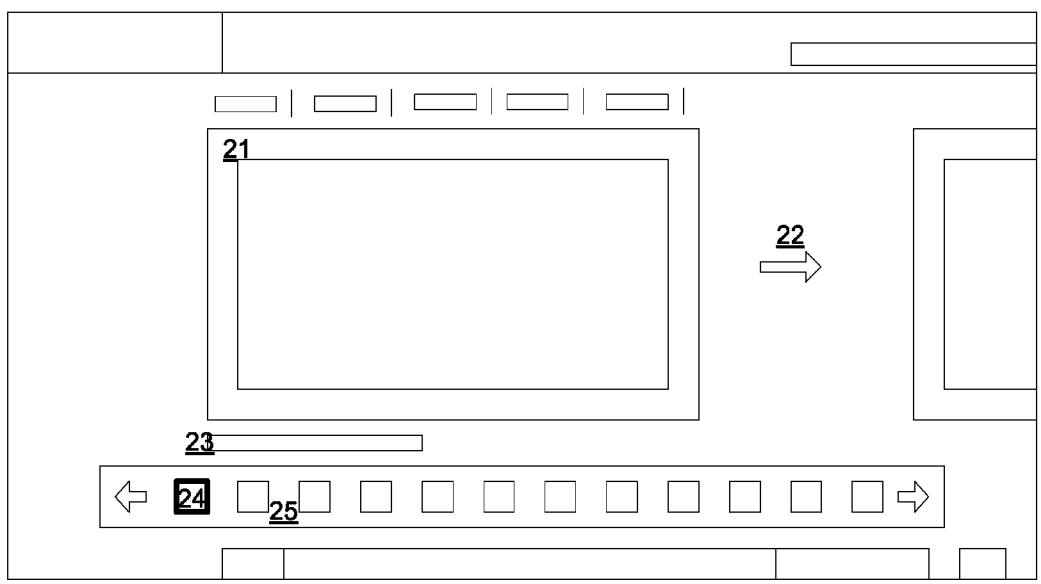
FIG. 2 shows an example embodiment of the present invention.

In FIG. 2, a slide view of an embodiment is shown. Slide 21 provides a display is focused on a single content element at a time, presented in a linear fashion as ordered by the content editor. The on click of a slide or lightbox in slide view displays the slide/lightbox in a selected state. The on click of an adjacent slide advances the slide view in the corresponding direction. The on double click of a lightbox in slide view opens the selected lightbox in slide view. Slide Navigation 22 provides content elements which may be navigated in three ways in slide view. Upon the user's cursor position moving sufficiently left or right, a directional arrow is displayed. The on click of the arrow advances the slide display in the corresponding direction. If no slide exists in the direction corresponding to the cursor position, no arrow is displayed. Users may click and hold a slide and drag either right or left to advance the slide in the corresponding direction. If no slide exists in the direction corresponding to the user's swipe, the slide does not advance. Slides may also be navigated through use of the slide carousel below. Slides are also navigable by using the left and right arrow keys, which advance the slide in the corresponding direction.

Content tags 23 are added to each slide upon slide creation. Content tags are only displayed in slide and full view, they are not displayed in grid view. The on click of a tag reloads the page to display all content tagged with the selected content tag in grid view. If no tags are associated with the current slide, the 'Tags:' copy is not displayed. Carousel navigation 24 is a slide view carousel which displays 10 (or other number) thumbnails at a time. The on click of the directional arrows advances the carousel 10 places in the corresponding direction. If the active slide is in the first or last position in the carousel and the user advances the slide using the slide navigation described in TAG 2, the carousel advances accordingly. Carousel navigation 25 is a thumbnail corresponding to the currently displayed slide is displayed in a highlighted or active state. The on click of a thumbnail advances the slides to the selected slide position without refreshing the page. In the carousel content wraps continuously. The last thumbnail is positioned to the left of the first slide and at the end of the slide order, advancing will bring the user back to the first slide.

Figure 3:
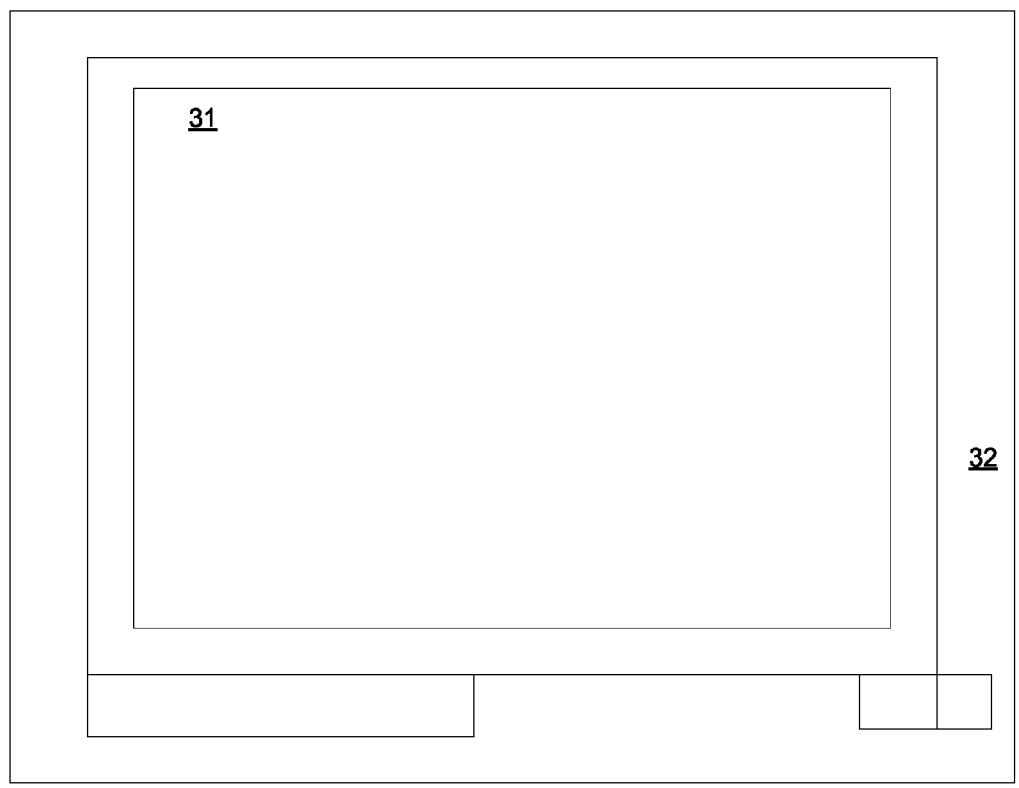
FIG. 3 shows an example embodiment of the present invention.

In FIG. 3, a full view of the slide is shown. In full view 31, the size of content displayed in full view is dependent upon the user's monitor resolution and browser window size. The content is displayed as large as possible given the viewable window size while accommodating the slide title and content tags. The content size will not exceed the dimensions of the original content asset uploaded. Full view may be exited by using the view toggle buttons, for example, or by pressing the 'Esc' key. If the user presses the 'Esc' key to exit full view the view returns to the previously selected view. Slide navigation 32 provides that upon the user's cursor position moving sufficiently left or right, a directional arrow is displayed. On click of the arrow advances the slide display in the corresponding direction. If no slide exists in the direction corresponding to the cursor position, no arrow is displayed. Users may click and hold a slide and drag either right or left to advance the slide in the corresponding direction. If no slide exists in the direction corresponding to the user's swipe, the slide does not advance. Full view controls can be shown at the bottom area below the slide. The controls can be shown for a few moments, and then retracted. Upon the user's cursor position moving sufficiently up or down, both panels slide back into view until the cursor leaves the area.

Figure 4:
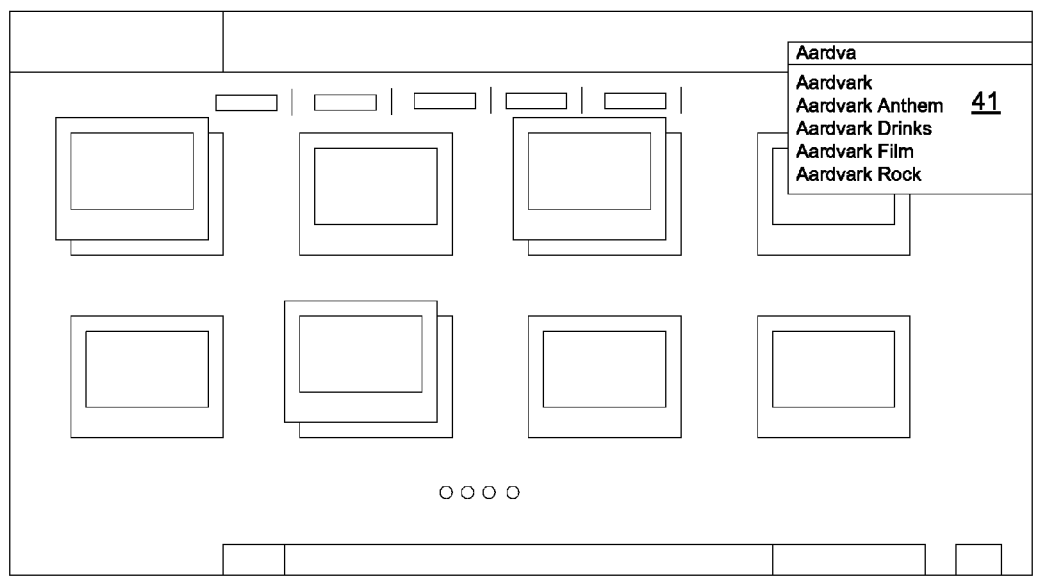
FIG. 4 shows an example embodiment of the present invention.
Figure 5:
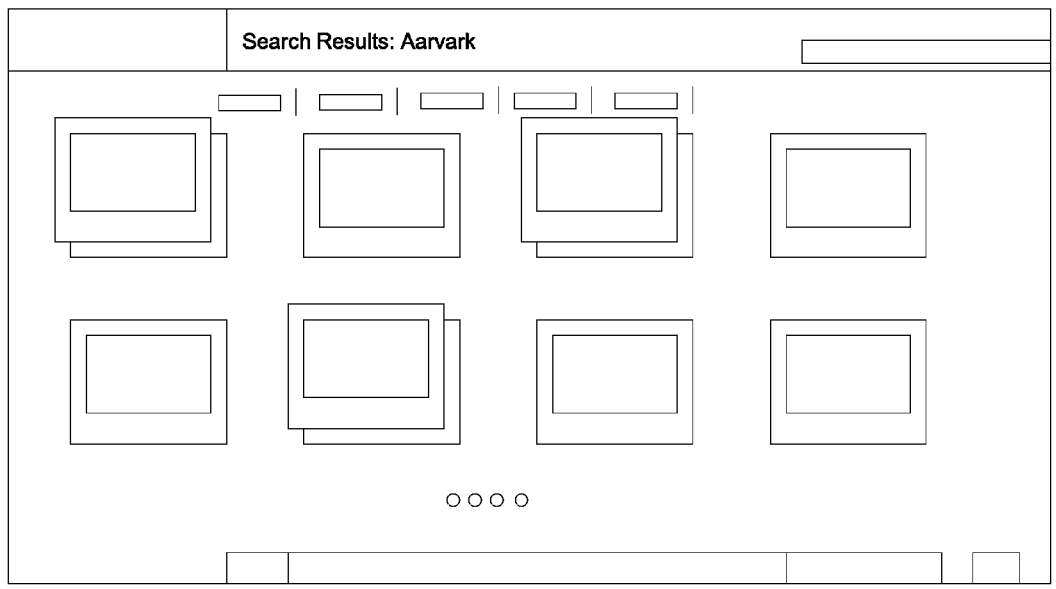
FIG. 5 shows an example embodiment of the present invention.

In FIG. 4, a search of the slides can be found. A dropdown or text field 41 can be provided. Related content can be displayed in a drop down box. In FIG. 5, an example of how the search results are displayed is shown.

Figure 6:
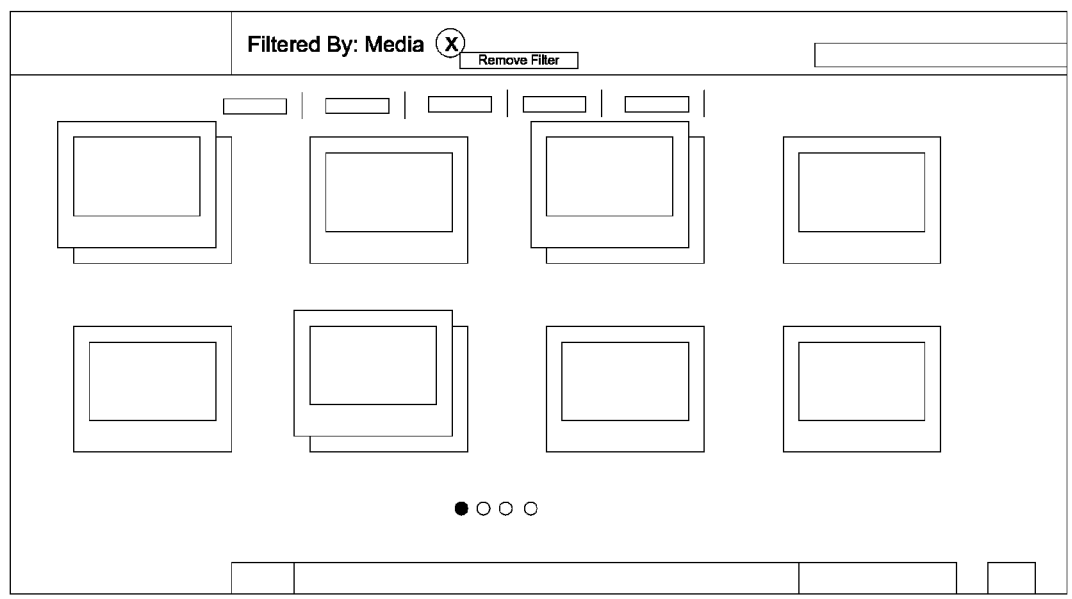
FIG. 6 shows an example embodiment of the present invention.

In FIG. 6, an example of a filtered view showing the slides associated with a tag term is shown. Following a submitted search, all slides/lightboxes related to the submitted query are displayed in grid view, ordered alphabetically. On double click of any of the slides/lightboxes within the search results opens the slide/lightbox consistent with standard functionality and places the corresponding lightbox title in the title bar, clearing the search results. Upon selection of a filter or content tag, the title bar displays "FILTERED BY:[FILTER/TAG TERM]. On rollover of the 'X' button displays a tool tip reading "Remove Filter". On click of the 'X' button removes the filter and returns the user to the previous page prior to the filter being selected. On double click of any of the slides/ lightboxes within the filtered state opens the slide/lightbox consistent with standard functionality and places the corresponding lightbox title in the title bar, removing the filter.

Figure 7:
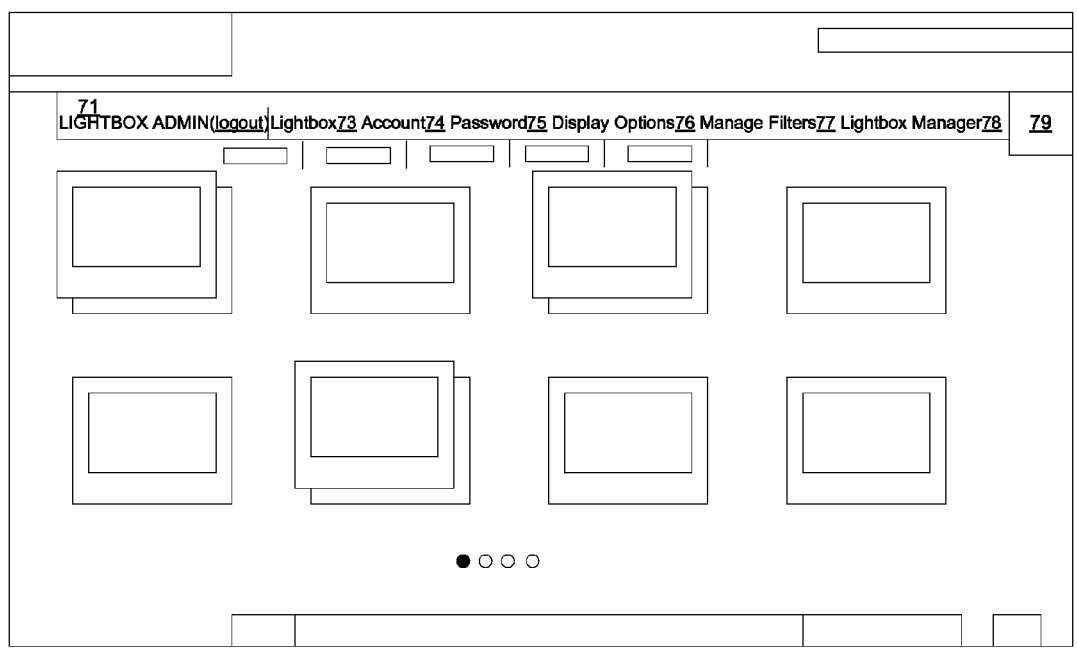
FIG. 7 shows an example embodiment of the present invention.
Figure 11:
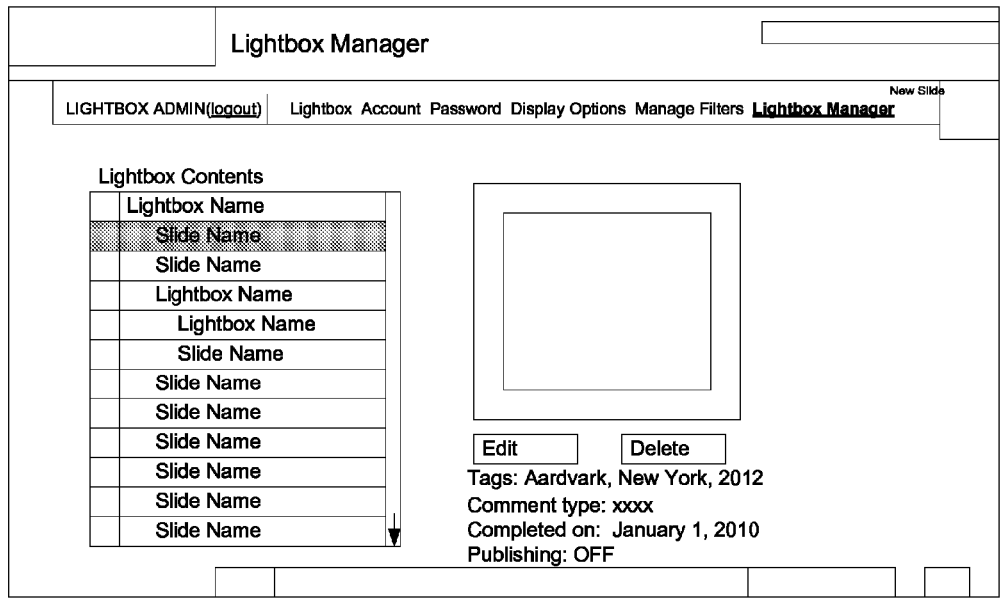
FIG. 11 shows an example embodiment of the present invention.
Figure 12A:
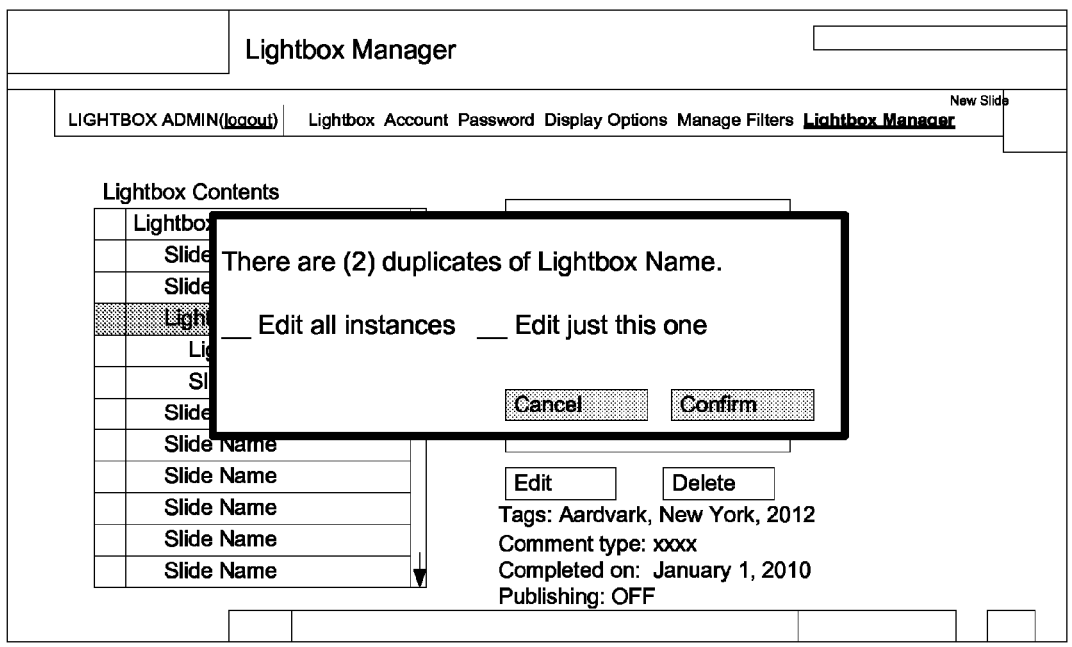
FIG. 12A shows an example embodiment of the present invention.
Figure 12B:
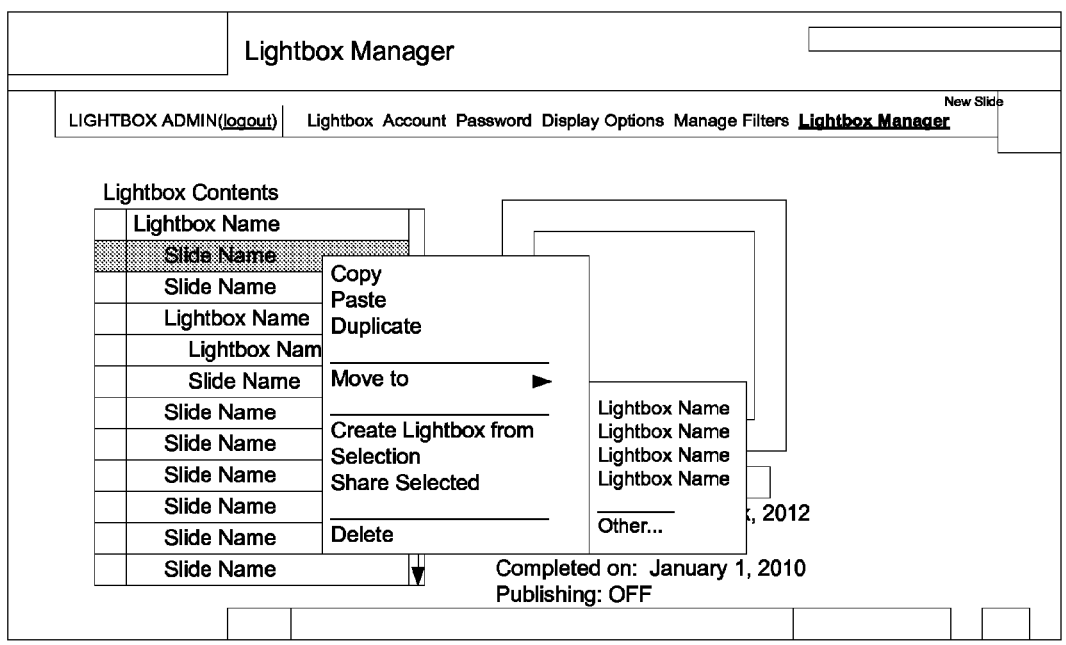
FIG. 12B shows an example embodiment of the present invention.
Figure 14:
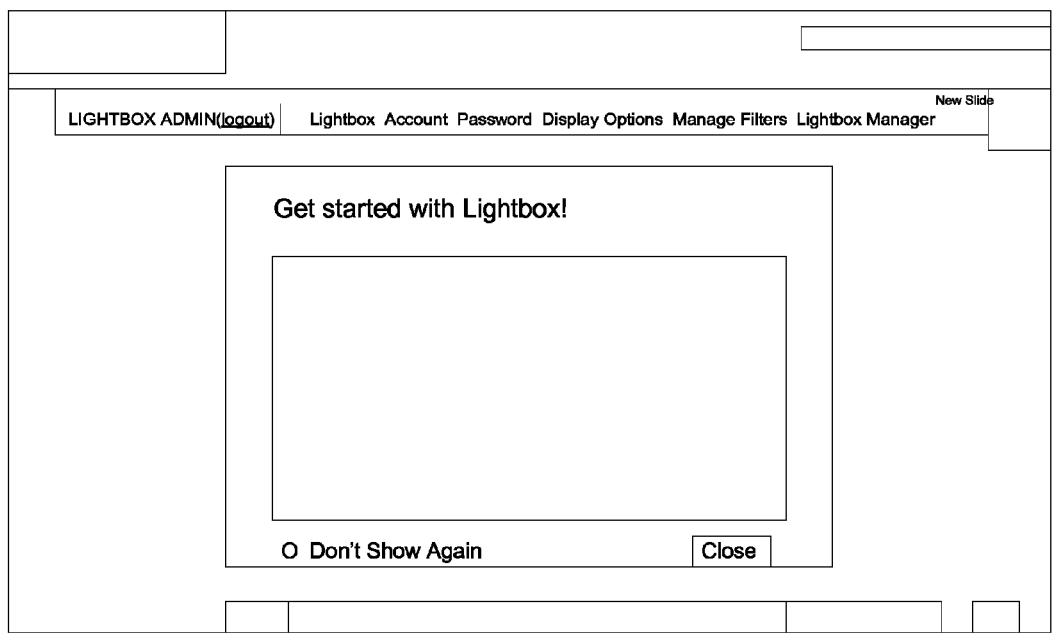
FIG. 14 shows an example embodiment of the present invention.
Figure 15:
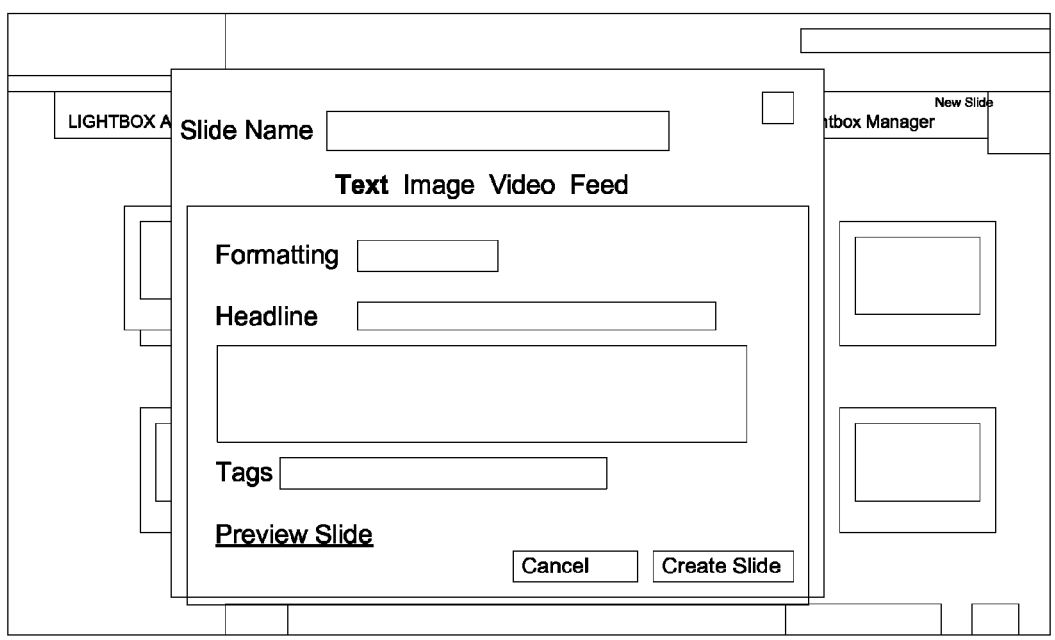
FIG. 15 shows an example embodiment of the present invention.
Figure 16:
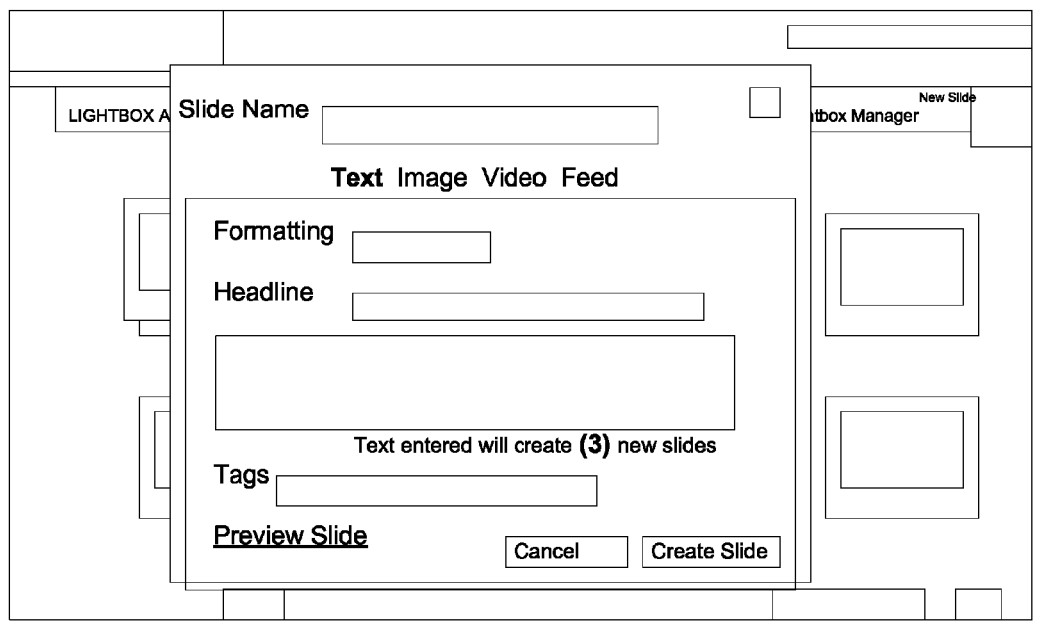
FIG. 16 shows an example embodiment of the present invention.
Figure 17:
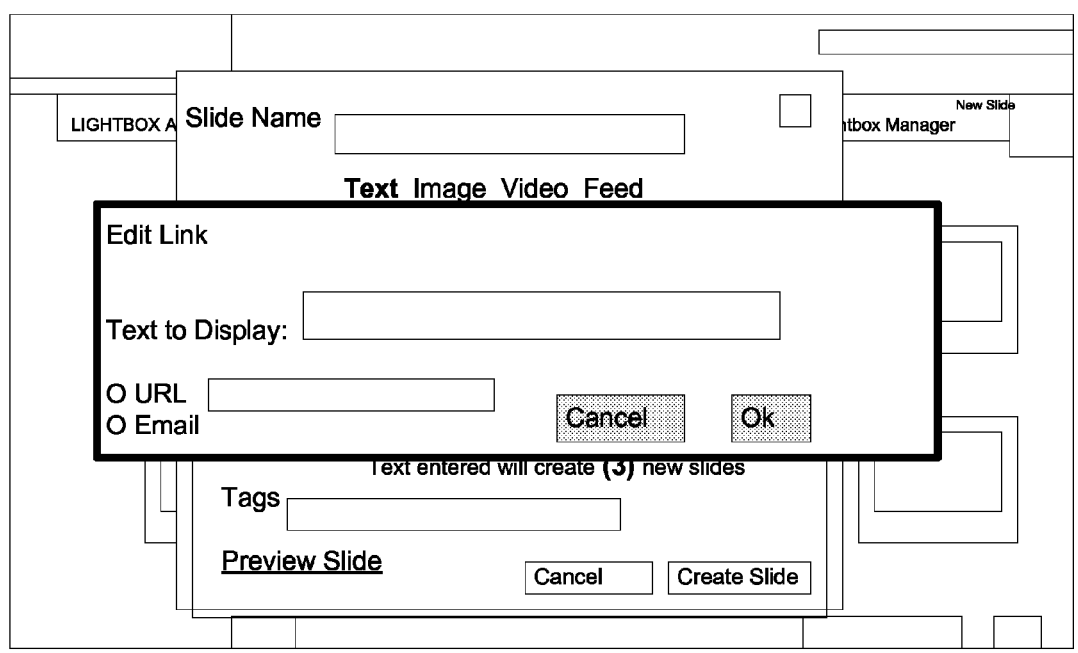
FIG. 17 shows an example embodiment of the present invention.
Figure 18:
FIG. 18 shows an example embodiment of the present invention.
Figure 19:
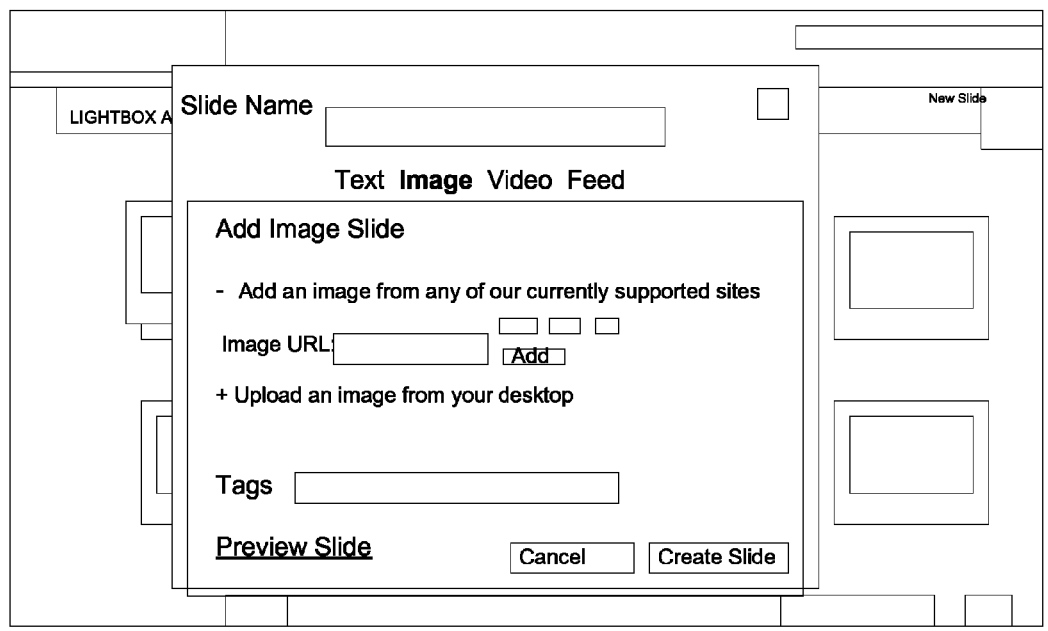
FIG. 19 shows an example embodiment of the present invention.
Figure 20:
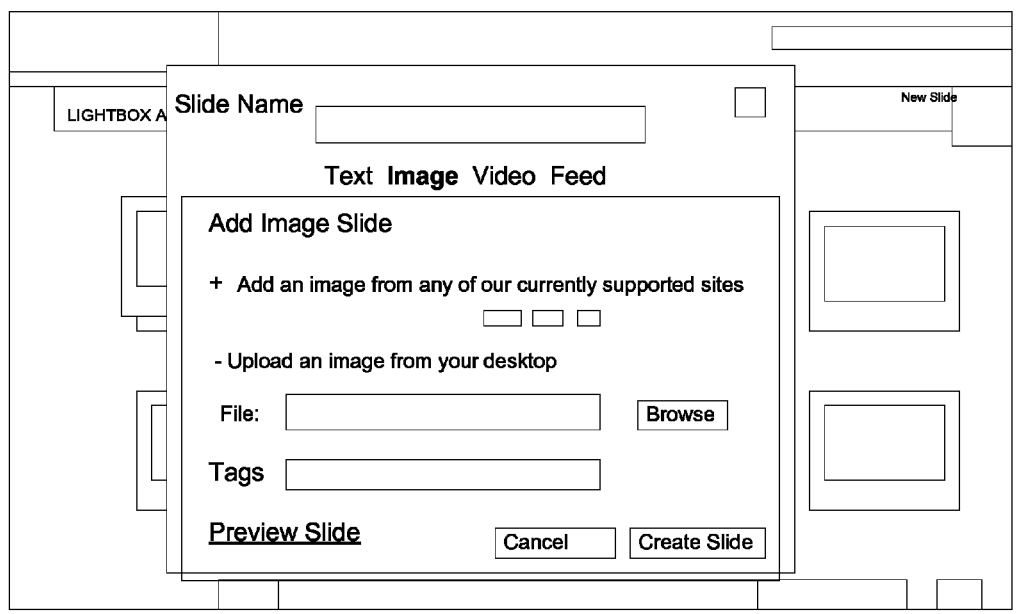
FIG. 20 shows an example embodiment of the present invention.
Figure 21:
FIG. 21 shows an example embodiment of the present invention.
Figure 22:
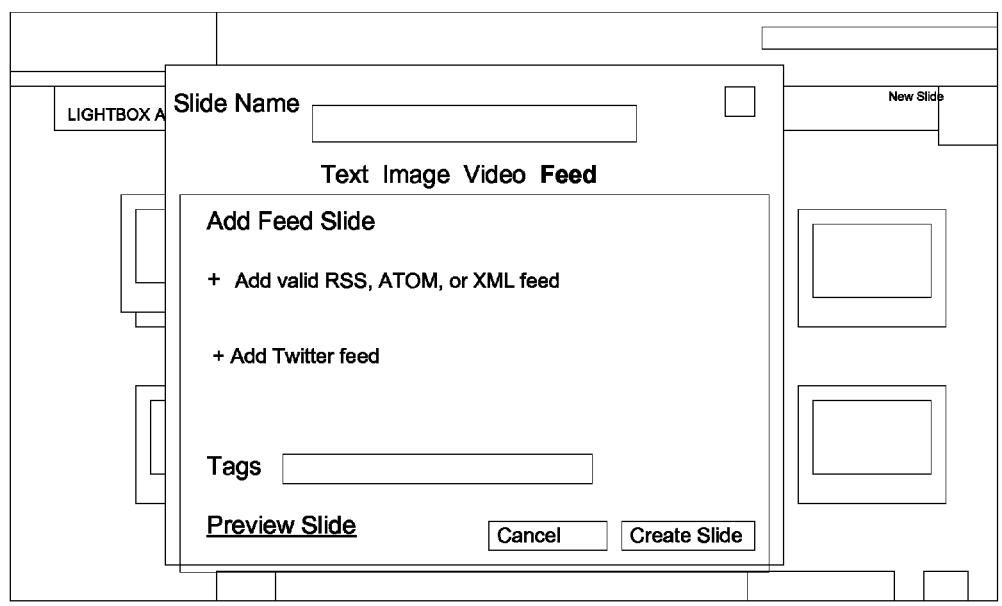
FIG. 22 shows an example embodiment of the present invention.
Figure 23:
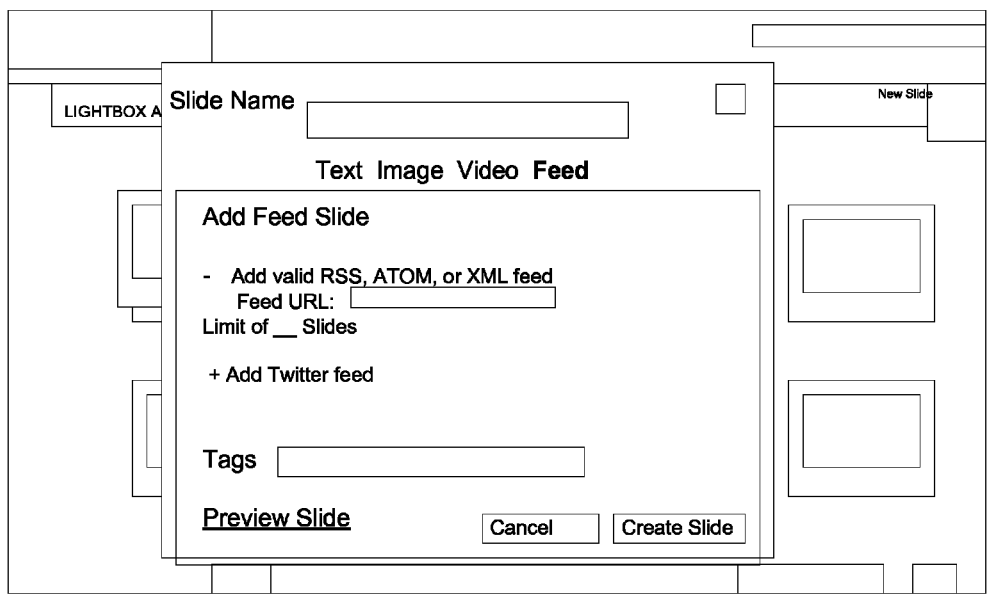
FIG. 23 shows an example embodiment of the present invention.
Figure 24:
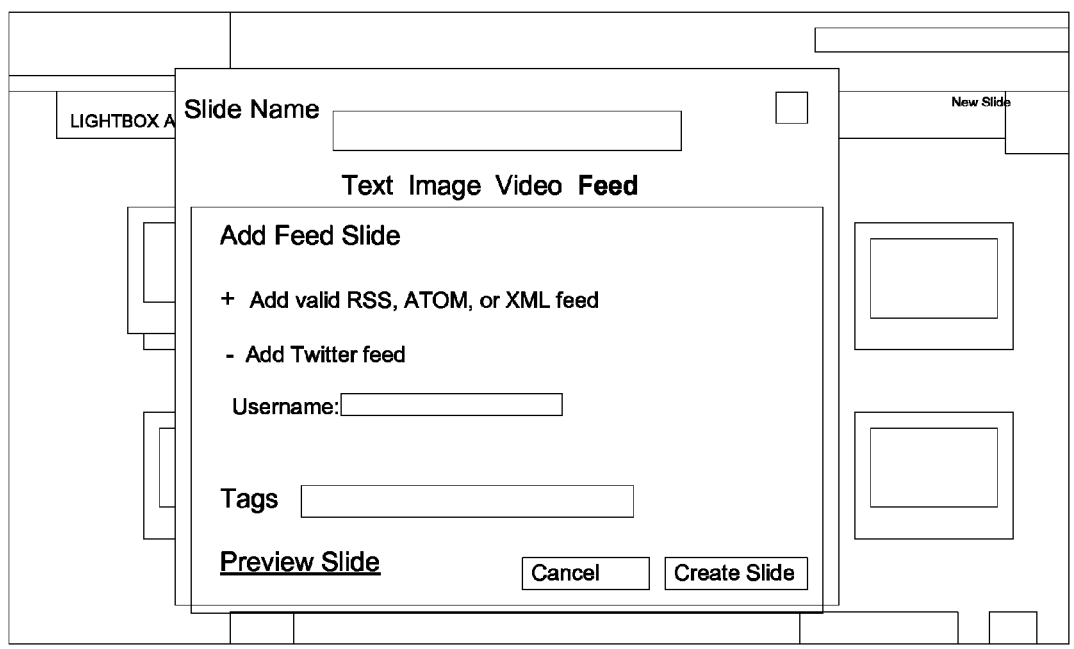
FIG. 24 shows an example embodiment of the present invention.
Figure 25:
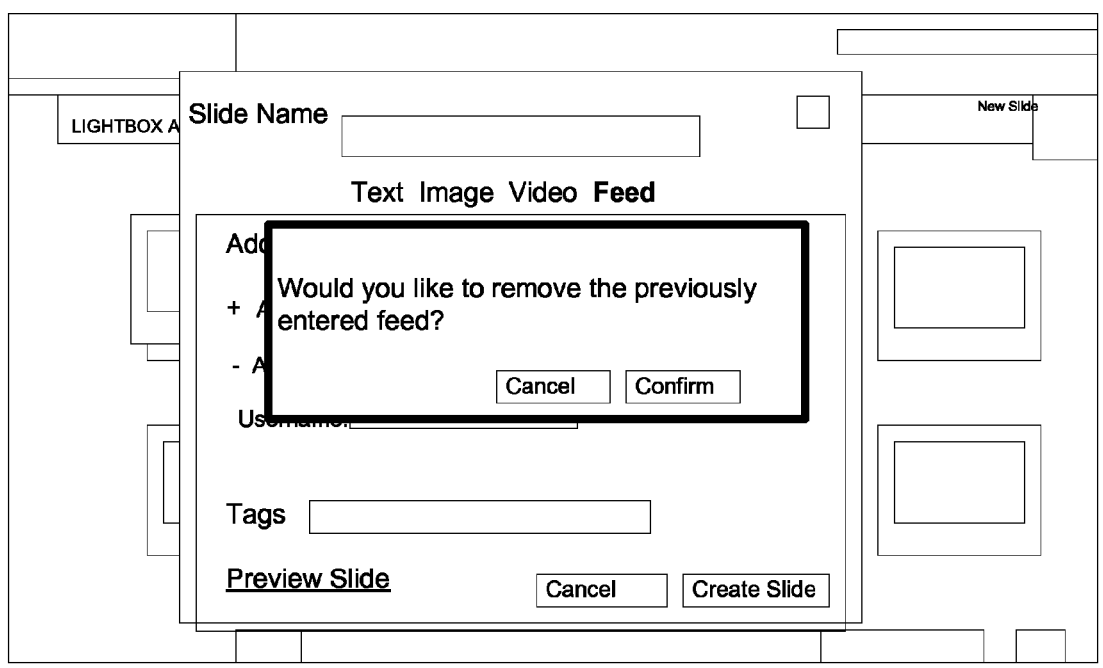
FIG. 25 shows an example embodiment of the present invention.
Figure 26:
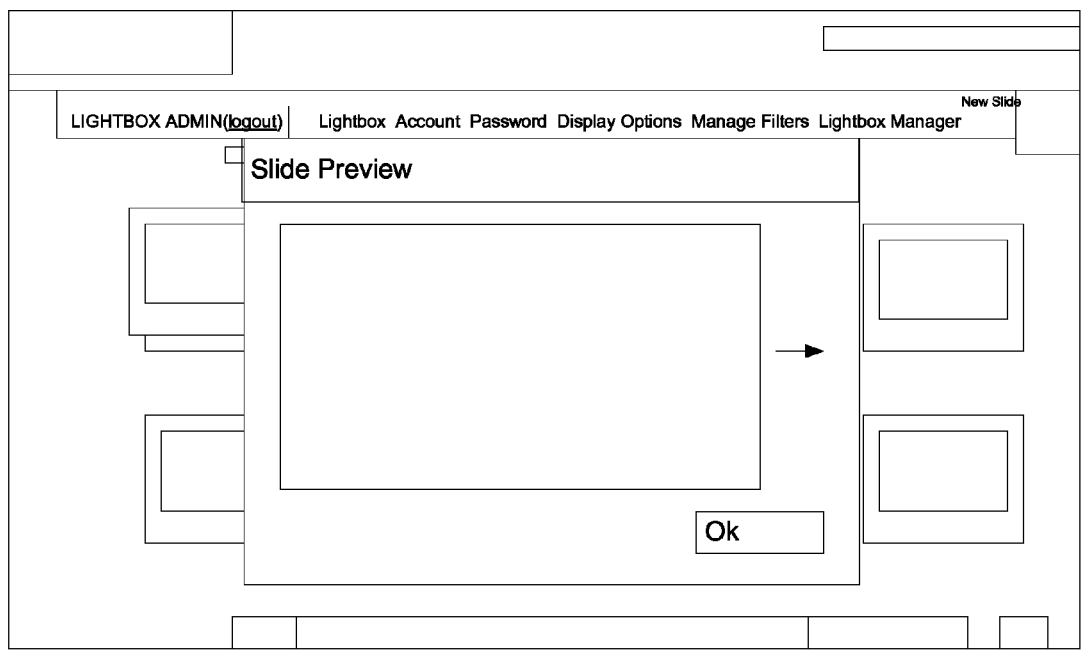
FIG. 26 shows an example embodiment of the present invention.
Figure 27:
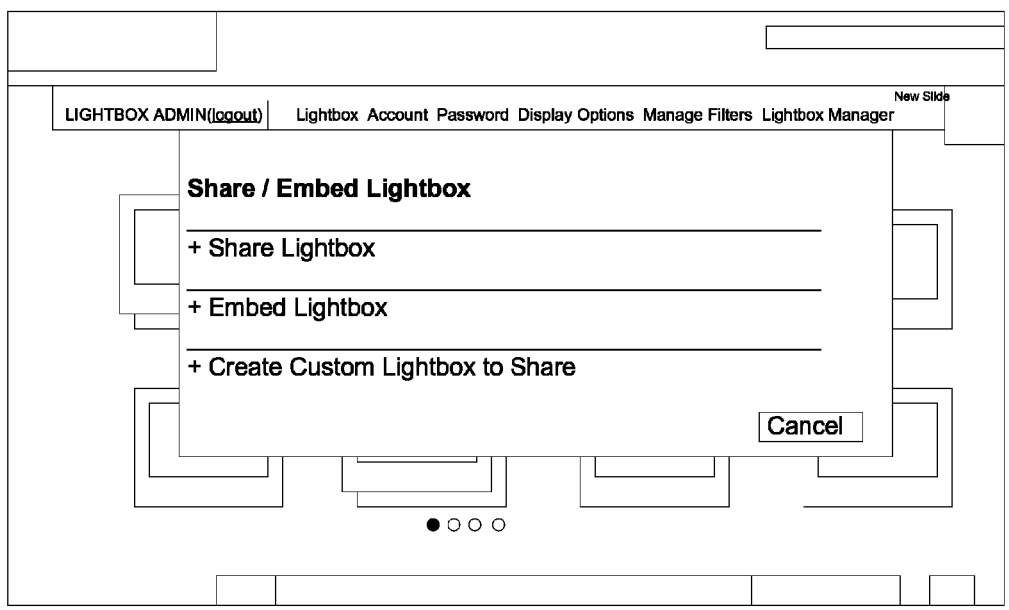
FIG. 27 shows an example embodiment of the present invention.
Figure 28:
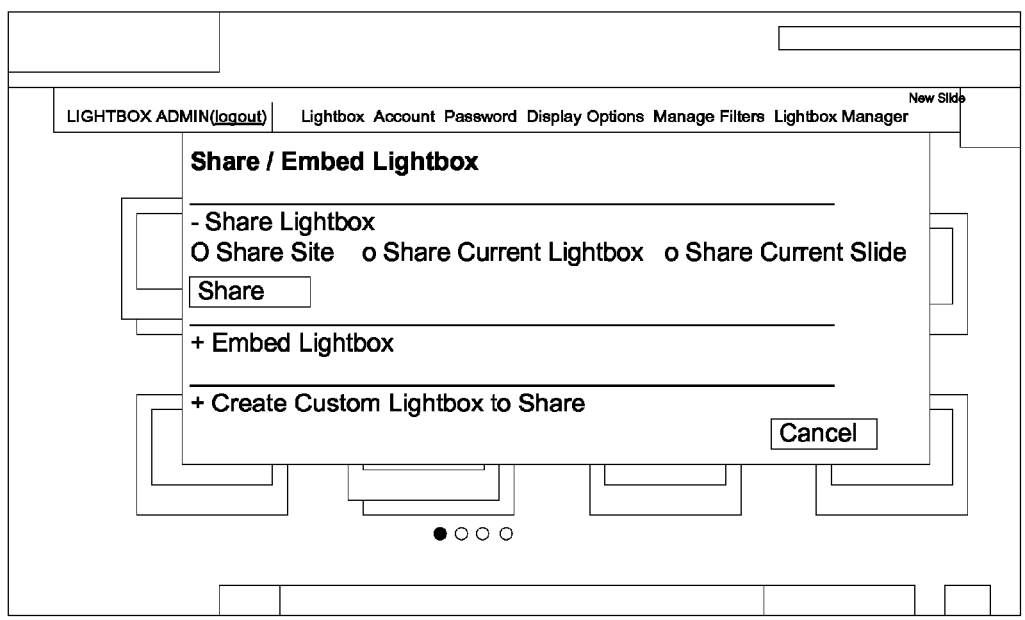
FIG. 28 shows an example embodiment of the present invention.
Figure 29:
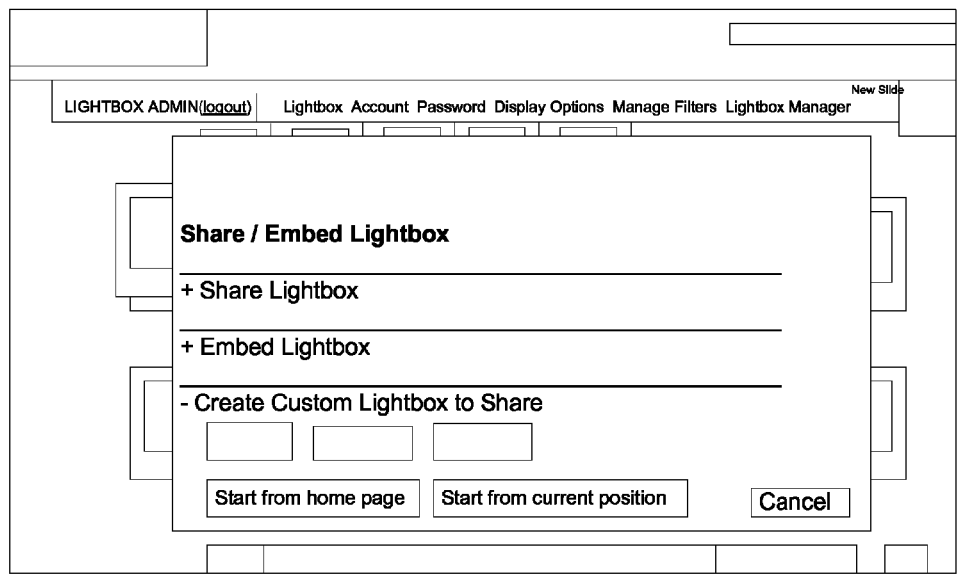
FIG. 29 shows an example embodiment of the present invention.
Figure 30:
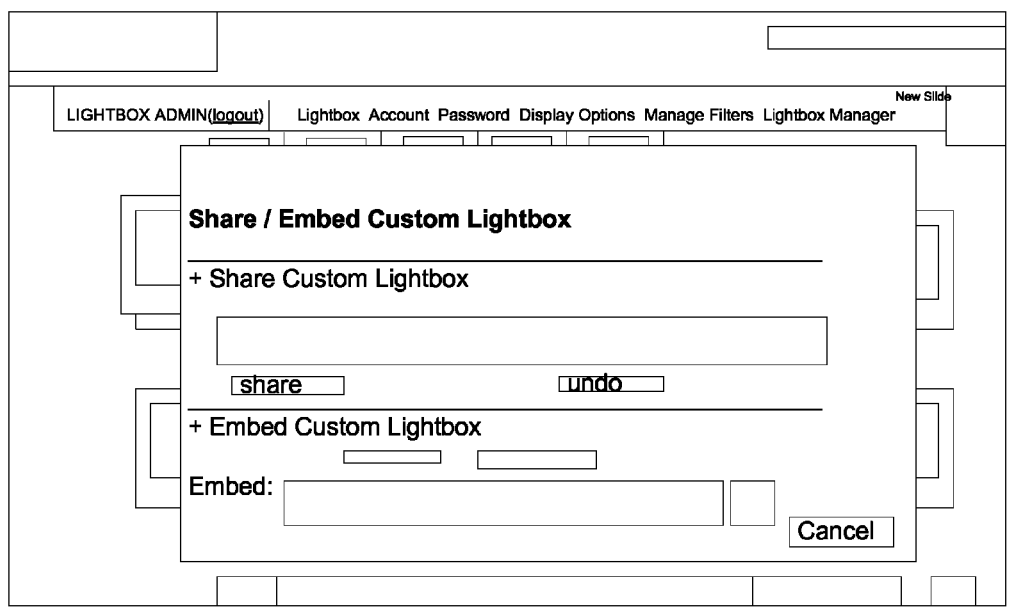
FIG. 30 shows an example embodiment of the present invention.
Figure 31:
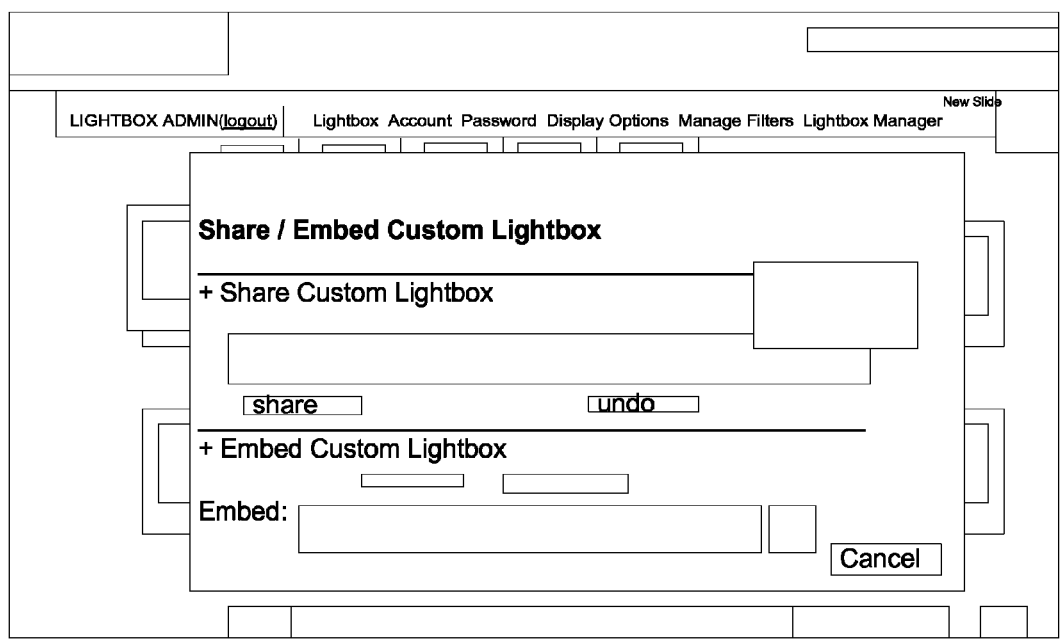
FIG. 31 shows an example embodiment of the present invention.
Figure 32:
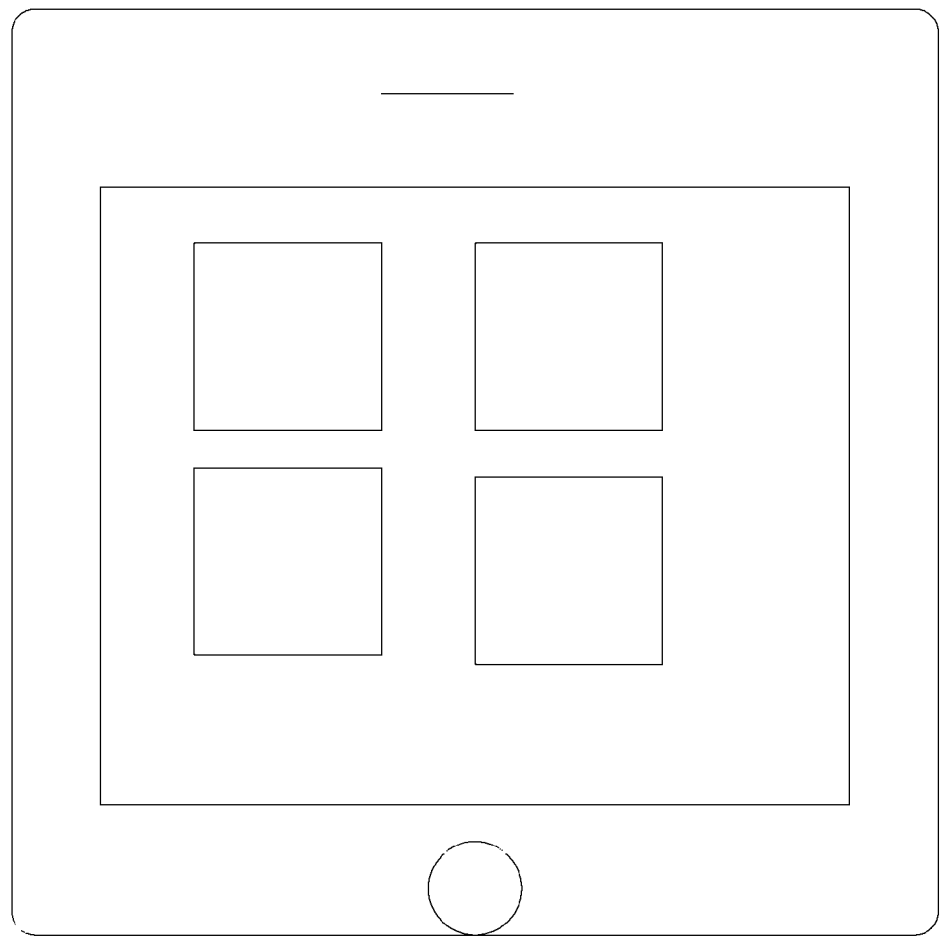
FIG. 32 shows an example embodiment of the present invention.
Figure 33:
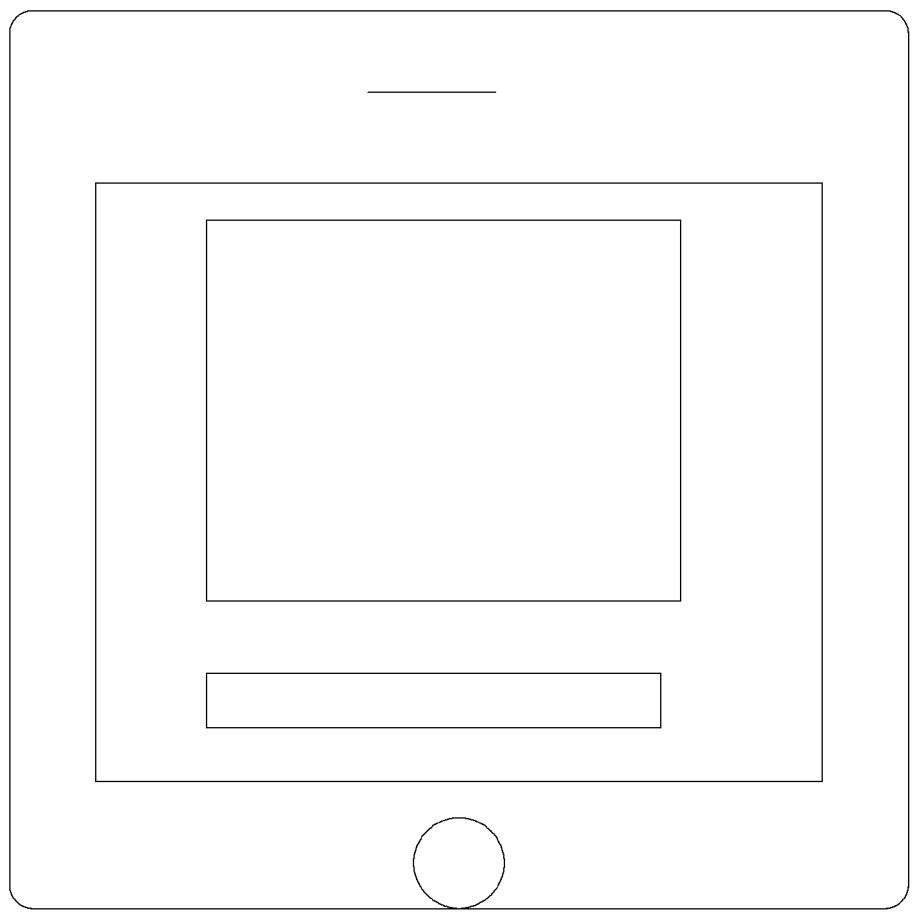
FIG. 33 shows an example embodiment of the present invention.
Figure 34:
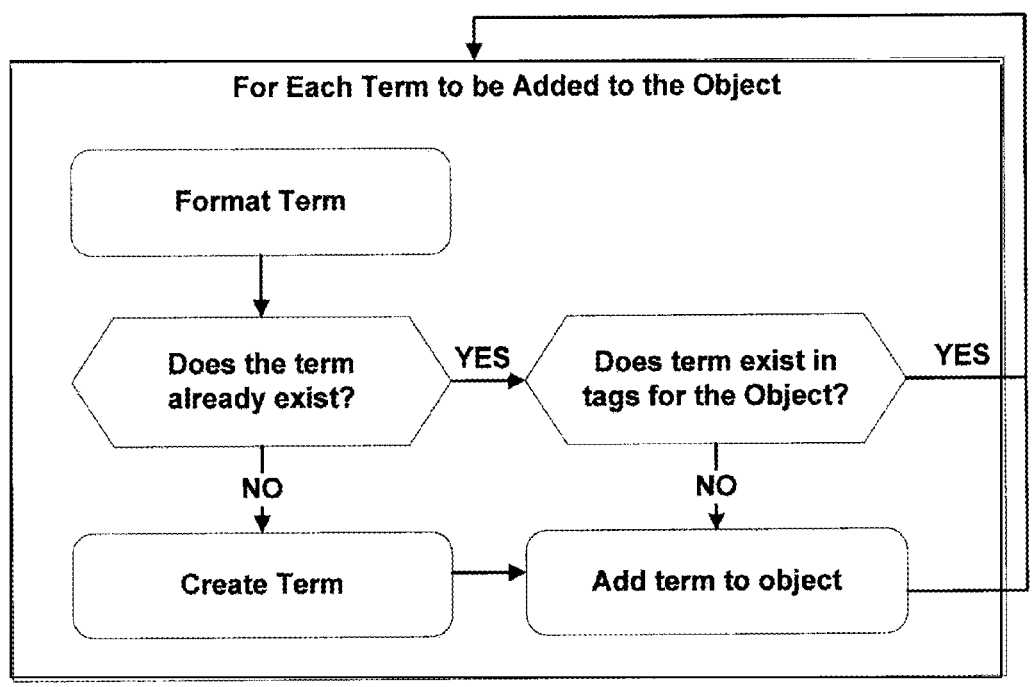
FIG. 34 shows an example embodiment of the present invention.
Figure 35:
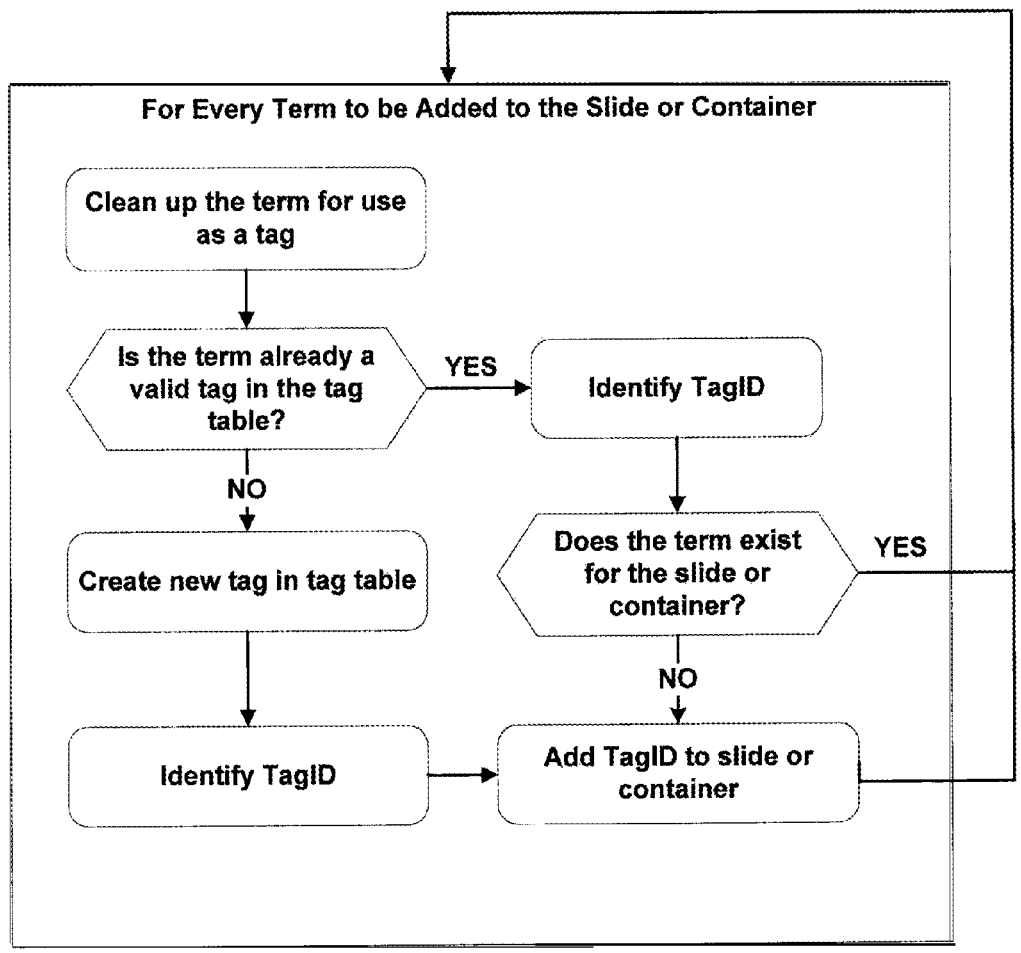
FIG. 35 shows an example embodiment of the present invention.
Figure 36:
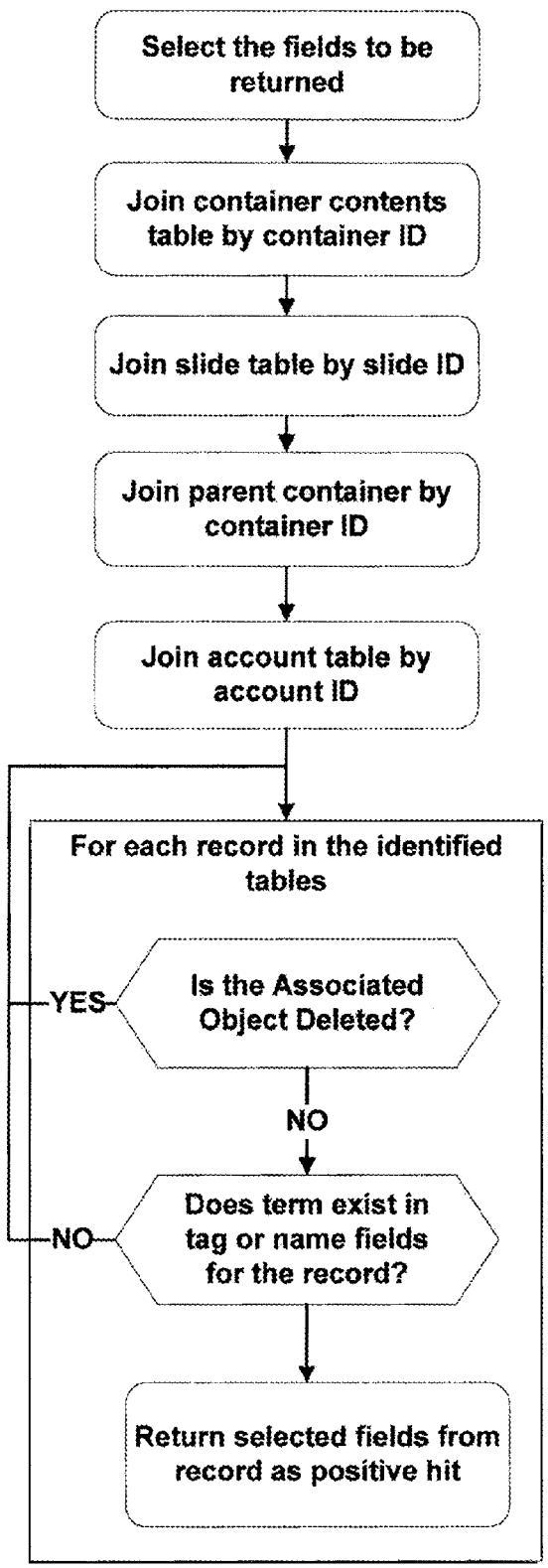
FIG. 36 shows an example embodiment of the present invention.
Figure 37:
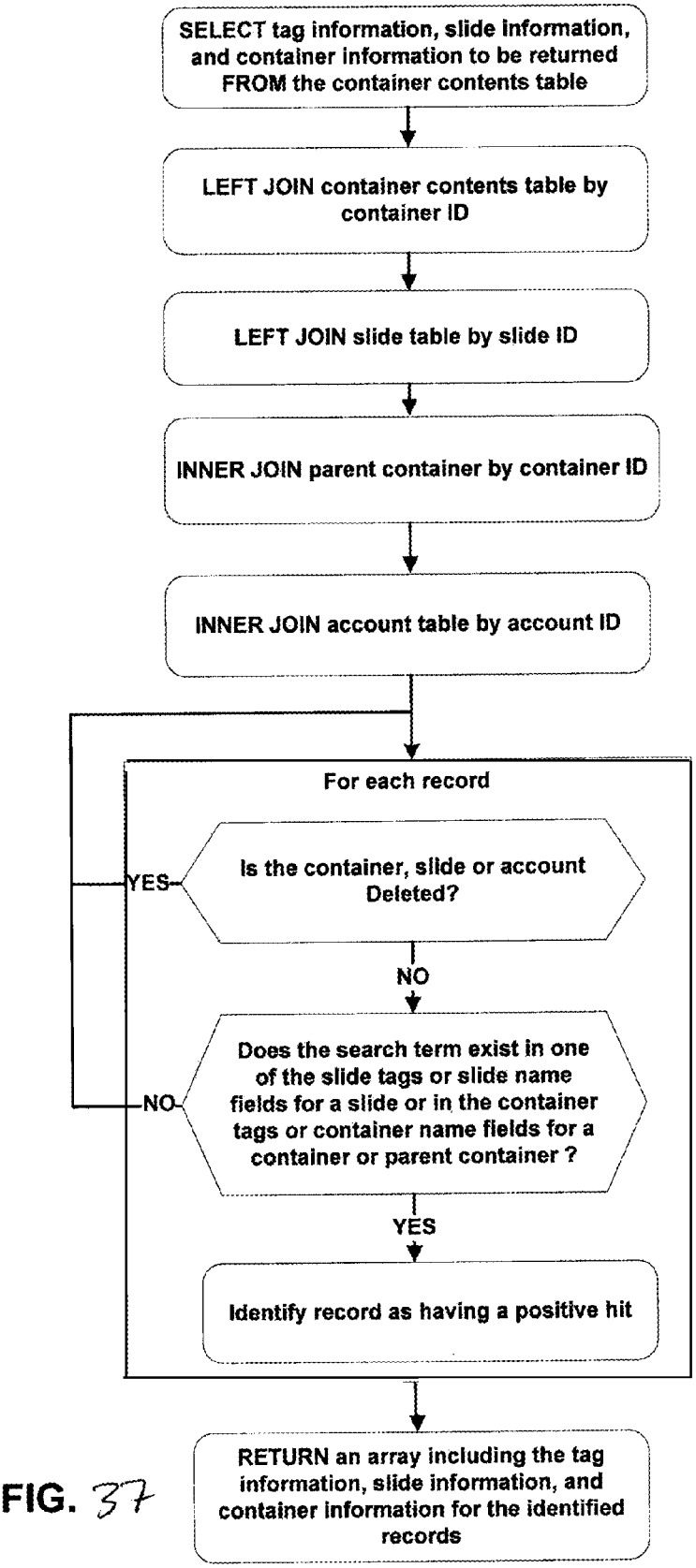
FIG. 37 shows an example embodiment of the present invention.

In FIG. 7, an administrative interface example is shown. In the Admin Toolbar 71, once an administrative user logs in, the Admin Toolbar is displayed allowing for content edits and account setting changes. The selected admin option is displayed in a highlighted or active state. On rollover the corresponding admin item is displayed in a rollover state. Logout 72 provides for a user to sign out upon a click and refreshes the page removing the Admin Toolbar and returning the user to the same page/lightbox view as was last seen while logged in.

Lightbox 73 provides for a default selection upon admin login. Displays the lightbox as seen by end users with the exception of the Admin Toolbar. The administrator may navigate the site as usual in this view. The contextual addition or editing of slides is accomplished in Admin Lightbox view. Account 74 allows the administrator to change username, email address, language, sharing, and privacy options. Password 75 allows the administrator to change the admin password. Display options 76 allows the administrator to make changes to the interface and other editable display options. Manage filters 77 allows the administrator to create filters that are displayed in the footer from content tags. Lightbox Manager 78 allows the administrator to make batch edits, organize the lightbox, set publishing options, and assign lightbox types.

New slide 79 allows for the adding of new slides by dragging and dropping this new slide icon onto the lightbox "stage". Adding new slides using this method is only possible when 'Lightbox' is selected within the Admin Toolbar, otherwise this selection is grayed out/inactive. Once the user has dragged the 'New Slide' icon from the originating position, the 'New Slide' icon is replaced with a dotted line or other indication to infer that the user has moved the new slide from the Admin Toolbar. When the new slide enters the lightbox view area, a line is displayed at the position that the new slide will be added on release given the current cursor position. On release of the new slide, the slides reorient (moving the slide in position to the next page), the slide flips over or otherwise animates to display the new slide content overlay which defaults to text entry. If fewer than 8 slides are present in grid view and the user drops the slide after the terminal slide, the slide will assume the end position in the ordering. While in the Admin>Lightbox view, the content editor may rearrange slides by clicking and holding, then dragging the slide to a new position. When the slide being moved traverses the lightbox view area, a line is displayed at the position that the slide will move to upon release given the current cursor position. The previous position is marked with a dotted line or other indication, "holding" the space and not allowing other slides to reorient until the user releases the mouse button. If the slide is dragged sufficiently left or right, the page will advance allowing the user to move a slide across pages. On release of the slide, the slides reorient, shifting position to accommodate the moved slide. While in the Admin>Lightbox view, on rollover of a slide or lightbox, an edit button corresponding to the slide/lightbox is displayed. On click of the edit button opens the edit slide overlay panel corresponding to the content type (text, image, video, feed) of the slide/lightbox. While in the Admin>Lightbox view, on rollover of a slide or lightbox, a delete button corresponding to the slide/lightbox is displayed. On click of the delete button a confirmation dialog box is displayed. Upon deletion of a slide/lightbox, the slides reorient to fill the vacated space. If the user deletes the last slide in a child lightbox, the view reverts to the parent lightbox on the page where the deleted lightbox appeared. If the user deletes the last slide in the master lightbox, the view reverts to the "first slide" view. The on click of the 'Delete' button corresponding to an existing slide or lightbox this confirmation dialog box is displayed. The copy changes depending on the type and name of the content being deleted. The on click of the 'Cancel' button, the dialog box disappears and no content is effected. The on click of the 'Confirm' button, the dialog box disappears, the content is deleted, and the remaining slides are reordered. If the slide being deleted is the only slide in the site, the view returns to the First Slide view.

When adding a new slide or moving a current slide/lightbox, the content editor may add the slide/lightbox to an existing lightbox or create a new lightbox by adding a slide to an existing slide. When a new slide or slide/lightbox being moved is sufficiently above an existing slide and held in position for ~2 seconds, the line indicating a move or insertion point changes to a hover state over the slide/lightbox below. On release of the mouse button, a dialog box confirming the addition to the other content item is displayed. If the slide/lightbox added to the below slide/lightbox was being moved, upon confirmation of the addition, the slides reorient but the view does not change. If the slide added to the below slide/lightbox was a new slide, the view changes to display the contents of the lightbox being added to and the new slide content overlay is displayed.

In an example, a new slide is added to an existing slide (results in the creation of a new lightbox), then confirmation dialog box is displayed, view changes to the newly created lightbox, and the new slide content overlay is displayed. If a new slide is added to an existing lightbox, then confirmation dialog box is displayed, and new slide content overlay is displayed. If an existing slide is added to existing slide (results in the creation of a new lightbox), then confirmation dialog box is displayed. If an existing slide is added to existing lightbox, then confirmation dialog box is displayed. Upon addition of a slide/lightbox to an existing lightbox this confirmation dialog box is displayed. The copy changes depending on the type of content being added and the type of content being added to. The on click of the 'Cancel' button, the dialog box disappears and no content is effected. The on click of the 'Confirm' button, the dialog box disappears and the content is added.

The account tab is displayed in its selected/active state.

The username entered by the user effects the URL of the user's lightbox following the format: http://www.lightbox.com/[username] or similar. The email field is provided on a screen to allow for submission of a form/correspondence. A language selector may be provided. An administrator has right to turn on and off the ability to share a lightbox or lightbox content. An administrator can allow guest logins, passwords or other security measures.

A browse button is provided to allow for an on click opens the users OS dialog box allowing them to select an image from their computer. Upon selection of a valid image (.jpg, .gif, .png), image begins to upload and button changes to state (b). Upon successful upload of image, button changes to state (c) allowing user to remove the entered image. On click of the remove link removes the image from the system and returns the button to state (a).

Upon successful upload of the selected image, image is resized to a maximum size of 120×36 px (TBD on visual design) and displayed at 100% image size here. Prior to upload of an image by the user, the image displayed is a default/placeholder image of the Lightbox CMS service. A user can add or remove context, links, etc. upon clicks of the appropriately labeled buttons/options. If the current image is the default/placeholder image, on click removes the image and not header image is displayed. If no image is specified as the header image, this link is not displayed.

Figure 9:
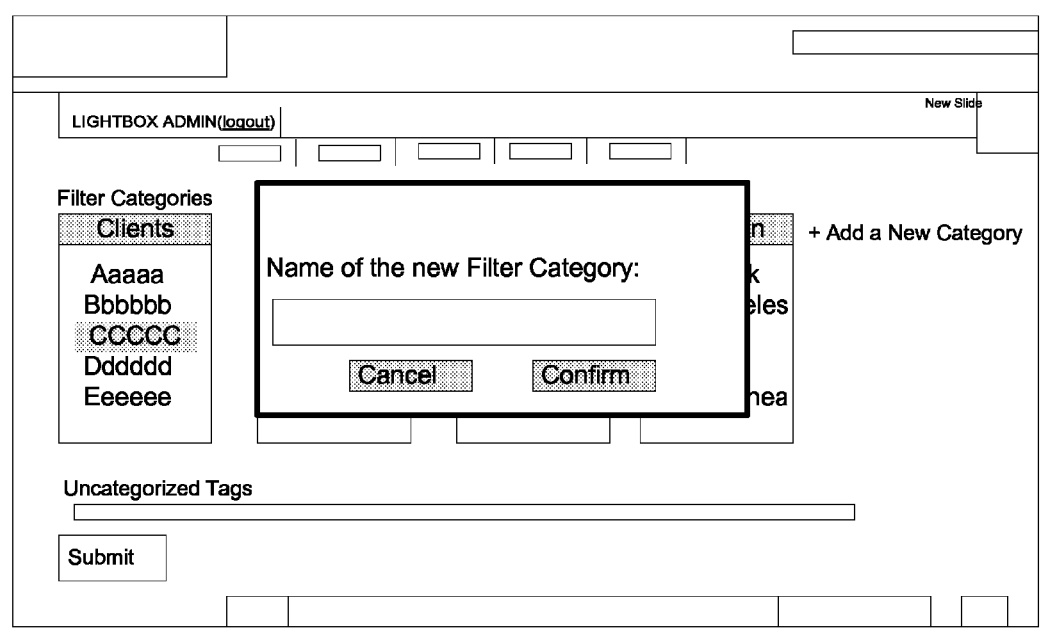
Figure 13:
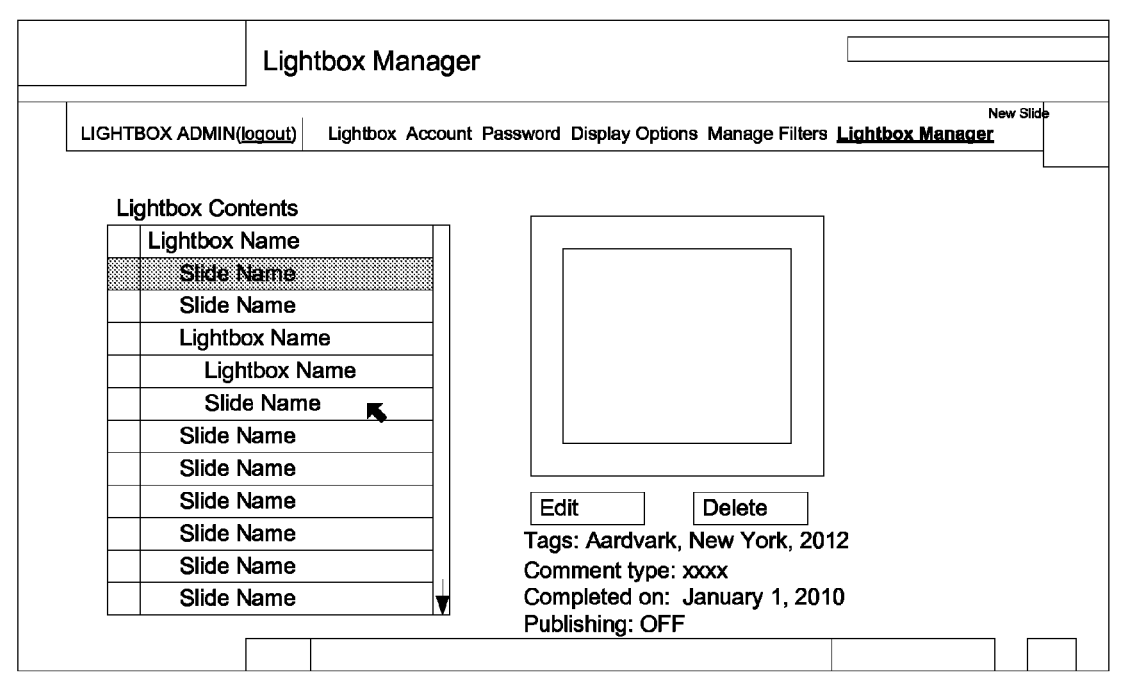

An administrator can set a default view for visitors of the site. The tags checkbox allows the administrator to turn on/off the display of content tags. FIGS. 8 and 9 show example screens regarding filter settings and categories. FIGS. 10, 11, 12, and 13 show various example screens regarding the lightbox setup and use.

FIGS. 14 to 33 show example embodiments of the present invention, including alternate views and addition of information.

In embodiments of the present invention, for a container model, the following can occur, including: checking to see if a published container belong to an account based on container_id and account_id; gets a specific slide and insures it is not deleted; creates a new container and configures it; updates container; adds tags to slide if it is a root container (e.g., a template) and updates the slides that use this container; and deletes the container after the update. In embodiments of the present invention, for a container contents model, the following can occur, including: gets an active container, i.e., one where "is deleted=false;" gets only slides that are published and the container is published; gets the published contents from container and the account id. Then it affirms that neither container nor account id is not deleted and is published; and gets the default active container. In embodiments of the present invention, for a project model, the following can occur, including: checks authentication, loading a lot of information such as helper files, models (e.g., templates), libraries etc.; allow access to non-Java users; checks the colors, the crop positions of the slides adds tags by account id; conduct resizing and adding of color. In embodiments of the present invention, for a slide, the following can occur, including: determines slide type, upload images, strip tags based on certain criteria, and perhaps uploading after criteria is met. For a slide model embodiment, all slides are selected for a particular account, a new slide is created, an active slide is updated, slide tags are added to the active slide, tags are split into an array, tags are stored in a tag table, tags are removed from the tag-slide and table.

In FIGS. 34 to 37, example tag model embodiments are shown. For example, to get the slides containing a search term for an account, with the terms and accountID input as parameters:

Where there are tables identifying accounts, parent containers, sub containers, slides, and container contents:
SELECT tag information, slide information, and container information
FROM the container contents table
LEFT JOIN the container table by container ID
LEFT JOIN the slide table by slide ID
INNER JOIN the parent container by container ID
and INNER JOIN the account table by account ID
WHERE the identified containers, slides and accounts are each not deleted (can also limit the search to only published containers, slides and accounts)
AND the search term exists in one of the slide tags or slide name field for the identified record, or in one of the container tags or container name fields for an identified container or the parent container.
RETURN an array including the tag information, slide information, and container information for the identified records organized by slide name and container name.

And, in an embodiment, to add a tag to a slide or container with the slideID or containerID, the accountID and the terms to be added as tags are input as parameters:

Where there are tables identifying accounts, containers, slides, and tags:
For every term to be added to the slide or container, clean up the term, for example by removing whitespace and making formatting consistent. Then check to determine if the term is already a valid tag in the tag table.
If the tag is not already in the tag table, then create a new tag, such that a new tagID is assigned to the new term. And identify the newly assigned tadID.
If the tag is already in the tag table, then identify the tagID for found tag.
Once a tag ID has been created or identified, if the tag does not already exists for the slide or container, add the tag ID to the slide or container.
If the slide or container already has the tag, no further action is required for that term. Return a message identifying the status of the update.

The various computer systems described herein may each include a storage component for storing machine-readable instructions for performing the various processes as described and illustrated. The storage component may be any type of machine readable medium (i.e., one capable of being read by a machine) such as hard drive memory, flash memory, floppy disk memory, optically-encoded memory (e.g., a compact disk, DVD-ROM, DVD±R, CD-ROM, CD±R, holographic disk), a thermomechanical memory (e.g., scanning-probe-based data-storage), or any type of machine readable (or computer readable) storing medium. Each computer system may also include addressable memory (e.g., random access memory, cache memory) to store data and/or sets of instructions that may be included within, or be generated by, the machine-readable instructions when they are executed by a processor on the respective platform. The methods and systems described herein may also be implemented as machine-readable instructions stored on or embodied in any of the above-described or other storage mechanisms.

Although the present invention has been described with reference to particular examples and embodiments, it is understood that the present invention is not limited to those examples and embodiments. The present invention includes variations from the specific examples and embodiments described herein. Except to the extent necessary or inherent in the processes themselves, no particular order to steps or stages of methods or processes described in this disclosure, including the figures is implied. In many cases, the order of process steps may be varied without changing the purpose, effect or import of the methods described.

What is claimed is:

1. A processor-implemented method for communicating information, comprising:

uploading a first material to a first slide;
uploading a second material to a second slide;
uploading a third material to a third slide;
linking the first, the second and the third slides to form a first linear sequence of slides and a second linear sequence of slides, such that:
   slides are arranged in a specified order for their respective sequences;
   the first slide and the second slide belong to the first sequence;
   the first slide and the third slide belong to the second sequence, which is non-linear relative to the first sequence;
   the first slide is first in the order of the second sequence;
   when viewing the first slide access is provided to both the second slide and the third slide; and
   when viewing the second slide access is not provided to the third slide as part of the first sequence,
wherein the linking of the first linear sequence of slides and the second linear sequence of slides occurs automatically upon uploading of material;
providing a user interface by which a user can switch between a grid view in which a first plurality of slides from one of the first and the second sequences are simultaneously displayed in sequential order on a two-dimensional grid, and a slide view in which a second plurality of slides from the one of the first and the second sequences are simultaneously displayed in sequential order as a one-dimensional slide arrangement, wherein the other of the first and the second sequences is hidden in either view; and
in a currently active one of the grid view and the slide view, switching between a display of slides in the first sequence and a display of slides in the second sequence in response to a user input applied to the first slide.

2. The method of claim 1, further comprising associating at least one tag and identifier with at least one of the first slide, the second slide, and the third slide.

3. The method of claim 2, further comprising:
initiating a search function of the at least one tag and identifier; and
displaying search results of all slides associated with the at least one tag and identifier search, wherein the slides searched include slides from both the first sequence and the second sequence.

4. The method of claim 1, wherein the first, second and third materials include at least one of: image, text and image, text and background image, RSS feed, photo, blog feed, and a feed from a social media website.

5. The method of claim 1, wherein the slides are viewable cross-platform.

6. The method of claim 1, wherein the slides are viewable on at least one of: a tablet, a smartphone, a desktop, a web browser, a netbook, a laptop, a server, a mobile device, and a mobile telephone.

7. The method of claim 1, further comprising:
linking a last-ordered slide in each sequence to a first-ordered slide in the respective sequence so that viewing of the slides in each sequence wraps around.

8. The method of claim 1, further comprising:
displaying only one sequence at a time unless a currently-viewed slide belongs to more than one sequence; and
when the currently-viewed slide belongs only to the second sequence, providing no access to the first sequence until the first slide is viewed.

9. A non-transitory computer-readable storage medium having instructions thereon for implementing a method for communicating information, the method comprising:
uploading a first material to a first slide;
uploading a second material to a second slide;
uploading a third material to a third slide;
linking the first, the second and the third slides to form a first linear sequence of slides and a second linear sequence of slides, such that:
   slides are arranged in a specified order for their respective sequences;
   the first slide and the second slide belong to the first sequence;
   the first slide and the third slide belong to the second sequence, which is non-linear relative to the first sequence;
   the first slide is first in the order of the second sequence;
   when viewing the first slide access is provided to both the second slide and the third slide; and
   when viewing the second slide access is not provided to the third slide;
providing a user interface by which a user can switch between a grid view in which a first plurality of slides from one of the first and the second sequences are simultaneously displayed in sequential order on a two-dimensional grid, and a slide view in which a second plurality of slides from the one of the first and the second sequences are simultaneously displayed in sequential order as a one-dimensional slide arrangement, wherein the other of the first and the second sequences is hidden in either view; and
in a currently active one of the grid view and the slide view, switching between a display of slides in the first sequence and a display of slides in the second sequence in response to a user input applied to the first slide.

10. The medium of claim 9 further comprising associating at least one tag and identifier with at least one of the first slide, the second slide, and the third slide.

11. The medium of claim 10, further comprising:
initiating a search function of the at least one tag and identifier; and
displaying search results of all slides associated with the at least one tag and identifier search, wherein the slides searched include slides from both the first sequence and the second sequence.

12. The medium of claim 9, wherein the first, second and third materials include at least one of: image, text and image, text and background image, RSS feed, photo, blog feed, and a feed from a social media website.

13. The medium of claim 9, wherein the slides are viewable cross-platform.

14. The medium of claim 9, wherein the slides are viewable on at least one of: a tablet, a smartphone, a desktop, a web browser, a netbook, a laptop, a server, a mobile device, and a mobile telephone.

15. A computer system for communicating information, comprising:
at least three electronic presentation slides stored on a non-transitory computer-readable medium in the system, wherein:
the at least three slides are linked within the system to form a first linear sequence of slides and a second linear sequence of slides;
slides are arranged in a specified order for their respective sequences;
a first slide and a second slide belong to the first sequence;

the first slide and a third slide belong to the second sequence, which is nonlinear relative to the first sequence;

the first slide is first in the order of the second sequence;

when the first slide is viewed, the system provides access to both the second slide and the third slide;

when the second slide is viewed, the system provides no access to the third slide;

the system provides a user interface by which a user can switch between a grid view in which a first plurality of slides from one of the first and the second sequences are simultaneously displayed in sequential order on a two-dimensional grid, and a slide view in which a second plurality of slides from the one of the first and the second sequences are simultaneously displayed in sequential order as a one-dimensional slide arrangement, wherein the other of the first and the second sequences is hidden in either view; and in the grid view, the system switches from a grid display of the slides in the first sequence to a grid display of the slides in the second sequence in response to a user input applied to the first slide.

16. A computer system for communicating information, comprising:

at least three electronic presentation slides stored on a non-transitory computer-readable medium in the system, wherein:

the at least three slides are linked within the system to form a first linear sequence of slides and a second linear sequence of slides;

slides are arranged in a specified order for their respective sequences;

a first slide and a second slide belong to the first sequence;

the first slide and a third slide belong to the second sequence, which is nonlinear relative to the first sequence;

the first slide is first in the order of the second sequence;

when the first slide is viewed, the system provides access to both the second slide and the third slide;

when the second slide is viewed, the system provides no access to the third slide;

the system provides a user interface by which a user can switch between a grid view in which a first plurality of slides from one of the first and the second sequences are simultaneously displayed in sequential order on a two-dimensional grid, and a slide view in which a second plurality of slides from the one of the first and the second sequences are simultaneously displayed in sequential order as a one-dimensional slide arrangement, wherein the other of the first and the second sequences is hidden in either view; and in the slide view, the system switches from a slide display of slides in the first sequence to a slide display of slides in the second sequence in response to a user input applied to the first slide.

17. A computer system for communicating information, comprising:

at least three electronic presentation slides stored on a non-transitory computer-readable medium in the system, wherein:

the at least three slides are linked within the system to form a first linear sequence of slides and a second linear sequence of slides;

slides are arranged in a specified order for their respective sequences;

a first slide and a second slide belong to the first sequence;

the first slide and a third slide belong to the second sequence, which is nonlinear relative to the first sequence;

the first slide is first in the order of the second sequence;

when the first slide is viewed, the system provides access to both the second slide and the third slide;

when the second slide is viewed, the system provides no access to the third slide;

the system provides a user interface by which a user can switch between a grid view in which a first plurality of slides from one of the first and the second sequences are simultaneously displayed in sequential order on a two-dimensional grid, and a slide view in which a second plurality of slides from the one of the first and the second sequences are simultaneously displayed in sequential order as a one-dimensional slide arrangement, wherein the other of the first and the second sequences is hidden in either view; and the system:
  switches a currently active one of the grid view and the slide view from a display of slides in the first sequence to a display of slides in the second sequence in response to a first user input applied to the first slide; and
  switches the currently active view from a display of slides in the second sequence to a display of slides in the first sequence in response to a second user input applied to the first slide.

18. The system of claim 17, wherein at least one tag and identifier is associated with at least one respective presentation slide so that upon initiation of a search function of the at least one tag and identifier, a display is made of all slides associated with the at least one tag and identifier search, the at least three presentation slides being searched include slides from both the first sequence and the second sequence.

19. The system of claim 17, wherein the at least three presentation slides are viewable cross-platform.

20. The system of claim 17, wherein the at least three presentation slides are coded in HTML5.

21. The system of claim 17, wherein in the grid view, the system displays slides from the first sequence while representing the second sequence using a slide stack in which slides of the second sequence are shown stacked behind the first slide.

* * * * *